United States Patent
Retlich et al.

(10) Patent No.: US 7,092,771 B2
(45) Date of Patent: Aug. 15, 2006

(54) INDUSTRIAL CONTROL AND MONITORING METHOD AND SYSTEM

(75) Inventors: Kevin A. Retlich, Wauwatosa, WI (US); Kelly J Lefler, Menomonee Falls, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 238 days.

(21) Appl. No.: 10/294,072

(22) Filed: Nov. 14, 2002

(65) Prior Publication Data

US 2004/0098148 A1    May 20, 2004

(51) Int. Cl.
*G05B 11/01*    (2006.01)
(52) U.S. Cl. .............................. 700/72; 700/83; 700/17; 700/96; 700/159; 702/188
(58) Field of Classification Search .................. 700/72, 700/83; 710/15; 707/513
See application file for complete search history.

(56) References Cited

U.S. PATENT DOCUMENTS

| | | | |
|---|---|---|---|
| 5,631,825 A | | 5/1997 | van Weele et al. |
| 5,880,716 A | * | 3/1999 | Kunugi ........................ 345/173 |
| 6,684,264 B1 | * | 1/2004 | Choi ............................ 710/15 |
| 6,965,855 B1 | * | 11/2005 | Burbridge et al. ............ 703/22 |
| 2002/0046221 A1 | * | 4/2002 | Wallace et al. .............. 707/513 |
| 2002/0149905 A1 | * | 10/2002 | Jackson, Jr. ................. 361/681 |
| 2004/0030460 A1 | * | 2/2004 | Bergmann et al. .............. 701/1 |
| 2005/0243505 A1 | * | 11/2005 | Jackson, Jr. ................. 361/683 |

OTHER PUBLICATIONS

A Word Definition From the Webopedia Computer Dictionary, p. 1-3, http://www.webopedia.com/TERM/i/interface.html.*
Beckhoff Industrial PC Control Panel, p. 1-3, http://www.beckhoff.com.cn/beckhoff/english/ipc/conpan.html.*

* cited by examiner

*Primary Examiner*—Anthony Knight
*Assistant Examiner*—Sunray Chang
(74) *Attorney, Agent, or Firm*—Patrick S. Yoder; Alexander M. Gerarimow

(57) ABSTRACT

A technique is provided for integrating human machine interfaces with control and monitoring systems. Control and monitoring systems may be integrated into a human machine interface to enable access to various systems including networked and programmable electrical components, such as components of motor control centers, and databases that including component, system designation data, configuration information, settings, and so forth. The database and components are accessed by execution of a program embedded in the human machine interface to provide desired information in response to selection of a particular physical component of the system. The information serves as the basis for an operator display through the human machine interface.

44 Claims, 16 Drawing Sheets

FIG. 12

EVENT LOG | DOCUMENTATION

SYSTEM 1 ▼ | DRAWINGS
 | REPORTS
 | MANUALS
 | SPARE PARTS

SYSTEM 1 SPREADSHEET VIEW

SELECT SORT
NONE ▼  ○ ASCENDING  ○ DESCENDING  ⊙ NONE

| DEVICE SERIAL... | DATE | SECTION | LOCATION | DESCRIPTION | DEVICE TYPE | USER 1 | USER 2 | USER 3 |
|---|---|---|---|---|---|---|---|---|
| 1074397223 | 06/16/2000 14:12:54 | 3 | A | SERIAL NO. CHANGE ON DEVICENET... | 1336PLUSII | | | |
| 1074397223 | 06/22/2000 11:03:26 | 3 | A | SERIAL NO. CHANGE ON DEVICENET... | 1336PLUSII | | | |
| 1074397223 | 06/23/2000 15:32:47 | 3 | A | NO COMMUNICATION | 1336PLUSII | | | |
| 1074397223 | | 3 | A | NO COMMUNICATION | 1336PLUSII | | | |
| ▶1074397223 | | 3 | A | FAULT | | | | |
| | | | | . . . | . . . | | | |
| | | | | | | | | |

SHOW/HIDE COLUMNS...

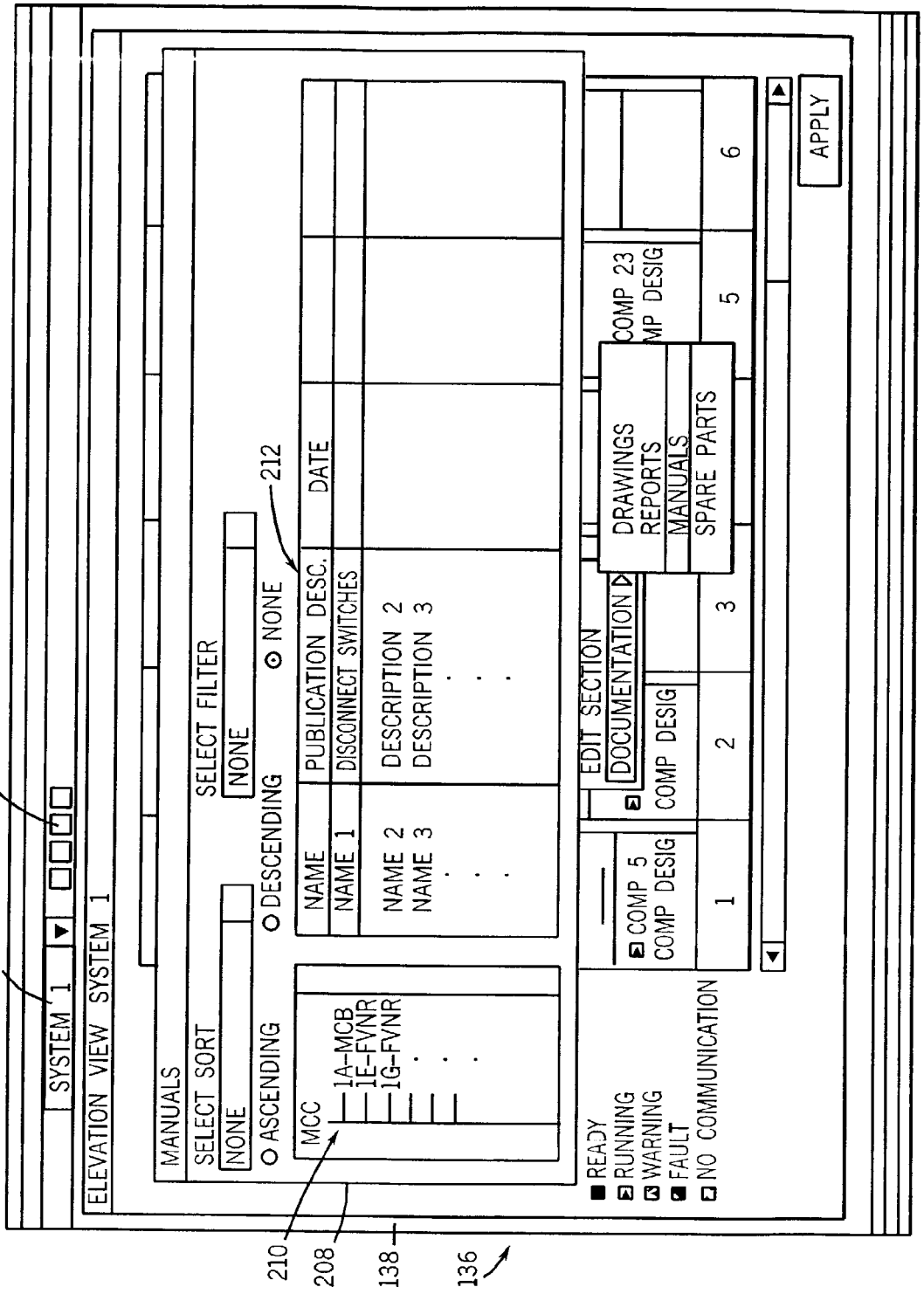

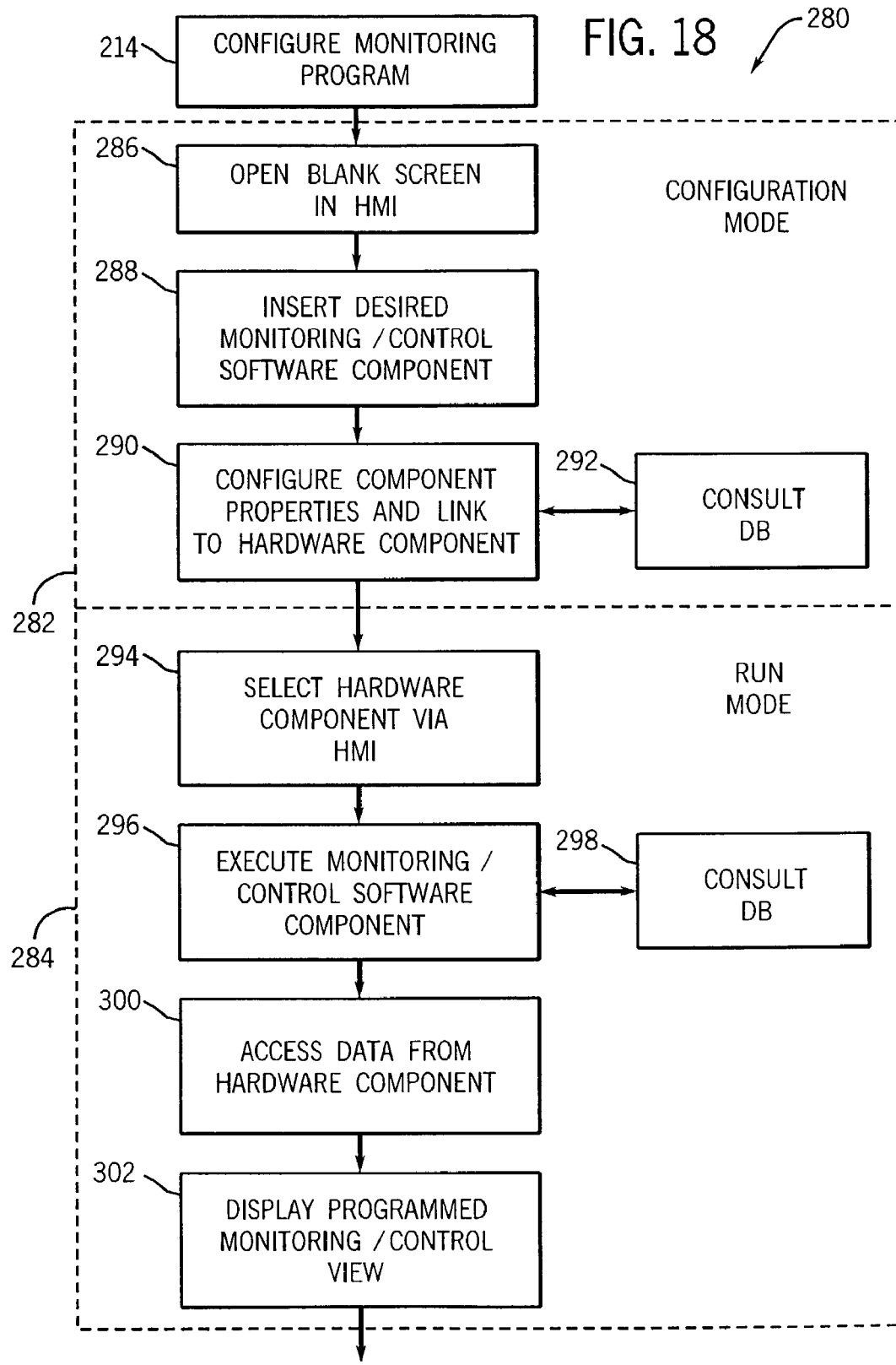

INDUSTRIAL CONTROL AND MONITORING METHOD AND SYSTEM

BACKGROUND OF THE INVENTION

The present invention relates generally to the field of electrical control and monitoring systems, and more particularly to a system and method that integrates functions control and monitoring into a human machine interface.

A wide range of systems are known and are currently in use for controlling and monitoring processes, particularly in the industrial context. Such processes may generally include a large number of components, such as pumps, valves, conveyors, material handling and machining systems, and so forth. In most applications a significant number of the components are operated by prime movers such as electric motors. These may be manually operated and inspected, but are often more effectively controlled through programmed systems including protective components as well as activating and control components.

One type of industrial control center that has been developed over recent years in generally referred to as a motor control center. Such systems may provide for highly integrated control of a large number of devices and can be equipped for remote control and reporting functions. Moreover, such remote control, typically via industrial control networks, is often highly desirable because it permits locating the protective and power control components roughly in the vicinity of the controlled equipment, which may be quite distant from the more centralized control or monitoring facility or room where human operators are based.

Challenges faced in implementing and maintaining complex control systems include the configuration of the control system and the representation of the system in a manner that can be quickly and easily mastered by human operators. Moreover, during operation, the representations of the system provided to the human operators, and the meaning of the various controls at the operators' disposal are of considerable importance insomuch as they permit the operator to make efficient and timely decisions based upon accurate understanding of the current and future conditions of the system. Planning, programming and configuration of such systems and networks is, however, quite difficult.

In addition to the programming concerns, operating the modem industrial control and monitoring systems often involves different programs that are utilized by the system. These separate programs each require extensive programming to provide information that allows the operator to monitor and control various processes. For instance, one program may include detailed information relating to individual programmable devices, such as manuals and drawings, while another program may provide functionality that enables an operator to view more the complete system that is operating the processes.

There is a need, therefore, for an improved technique which may be employed to more effectively present and access information relating to an overall process or system in a human machine interface, while providing detailed and current information on specific components of interest upon demand by an operator. There is a particular need for a technique which will provide greater uniformity and consistency for the operation of the processes by integrating the information of various levels within the modern industrial control and monitoring systems, reducing development and programming time associated with the various programs, and enabling the operator to perform a greater level of diagnostics from a single interface.

SUMMARY OF THE INVENTION

The present invention provides a novel technique for integrating human machine interface and monitoring system programming functions, and providing these functions to a user of a monitoring system. The technique may be employed with a wide range of systems, but is particularly well suited to industrial automation systems where various programmable components are integrated to provide cooperative functions. In accordance with the technique, the design of the system utilizes component information such as from a database, that serves as the basis for component specification, network designations, and so forth. The database may be used to generate the selected component's operational parameters, and may be modified in accordance with user's preferences.

During the operation of a human machine interface, a display may be modified to provide the user with additional information for a specific component. Based upon a request initiated by the operator from the human machine interface, the database information may be obtained to provide the human machine interface with component operational data, such as for a specific component selected from a system representation by the operator. Specifically, the database may serve various operational parameters, which are configured for a user viewable screen and related to various components, to an executable program within the human machine interface. The data stored in the database or available from the selected component may be displayed to the users by activating an icon or virtual button on a display, which initiates the embedded executable program. The information retrieved may be the identity of the components, their functions in the system, system designations, locations of components in the system, network node points, and so forth. Once the virtual button is activated or the component is selected, the system may generate a screen within the human machine interface that provides the appropriate information requested via the operation of the embedded executable program.

In an exemplary embodiment, the technique may be employed for specific components in networked industrial automation systems, such as motor control centers with a human machine interface. In a motor control center application, software used to design the system and specify components, such as motor controllers, variable speed motor drives, relays, switch gear, and the like, initiates the database which is used throughout the integrated procedure. By integrating the motor control center human machine interface with embedded executable programs for accessing and displaying data for specific represented components, the user of the human machine interface may be configured for monitoring and control functions with minimal programming effort. With the added functionality, the user may be able to more efficiently operate and maintain the process that is being controlled by the system.

BRIEF DESCRIPTION OF THE DRAWINGS

The foregoing and other advantages of the invention will become apparent upon reading the following detailed description and upon reference to the drawings in which:

FIG. 12 is a view of event logs viewable on a monitoring station and illustrating links to drawings, reports, manuals and spare parts lists in an integrated documentation system;

FIG. 13 is a view of support materials, such as manuals accessible from the menu illustrated in FIG. 12;

FIG. 18 is a flow chart illustrating exemplary logic in the programming and operating phases of the system illustrated in the foregoing figures.

DETAILED DESCRIPTION OF SPECIFIC EMBODIMENTS

The present technique is an improved approach to component and system monitoring and control, which may be implemented to integrate an operator interface with a control and monitoring system to provide greater functionality via an embedded executable program. The technique provides greater uniformity and consistency in the operation of various processes by integrating the information obtainable in various disparate systems within control environment. In addition, the present technique reduces the development and programming time associated with the various programs and enables the operator to access a larger amount of diagnostics information from a single interface.

For instance, while not limited in any way to such applications, the present technique enables the coordination of monitoring and control of the industrial systems, such as between human machine interface (HMI) and a motor control center (MCC). The integration may be implemented by embedding an executable software component within the HMI to provide the functionality of the MCC without the associated complexity of programming each component or lengthy programming of the HMI to carry out functions of the MCC control system. Advantageously, this technique reduces the HMI development time by providing easy insertion methods that enable the desired functionality. Also, the technique provides predictive failure information and component history to the HMI, which enables the operator to quickly and efficiently retrieve information related to operating systems. Furthermore, the technique may be implemented to provide the HMI with access to the documentation, drawings, catalogs, and manuals for the various MCC systems and system components.

To clearly understand the present technique, a discussion of the monitoring and control systems is detailed below. Then, a detailed discussion of the integration of the system with the human machine interface will follow.

Monitoring and Control Systems

Figure 1:
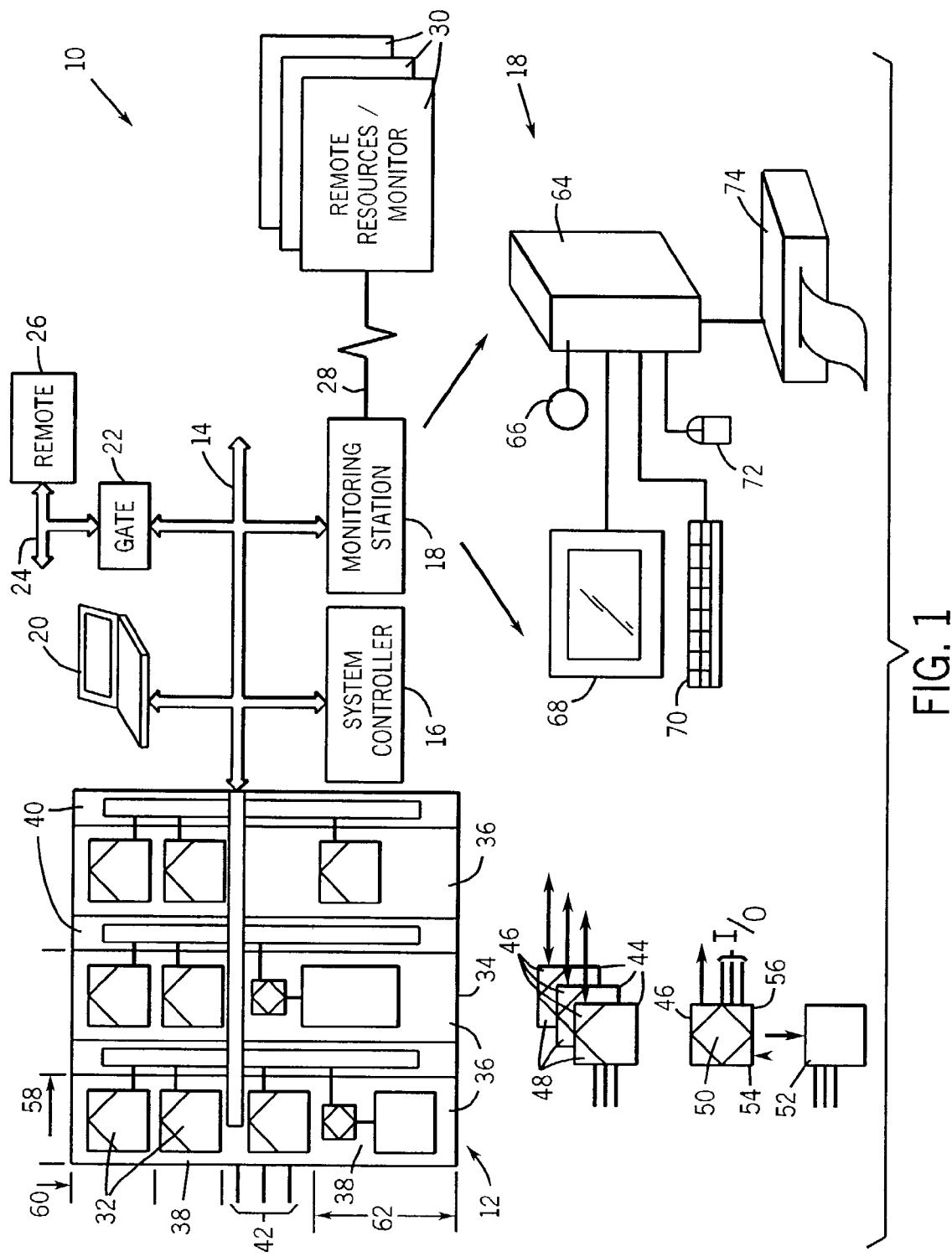
FIG. 1 is a diagrammatical representation of an electrical control and monitoring system including networked programmable components and monitoring stations, remote resources, and additional network components in accordance with aspects of the present technique.

Turning now to the drawings, and referring first to FIG. 1, a control and monitoring system 10 is illustrated as including a component assembly 12, and a network 14 for transmitting data to and from components of the assembly. While the component assembly 12 may take many forms, and include devices for accomplishing many different and varied purposes, in a preferred implementation, the component assembly includes electrical control and monitoring equipment for regulating application of electrical power to loads. In particular, the components may include motor starters, motor controllers, variable frequency drives, relays, protective devices such as circuit breakers, programmable logic controllers, and so forth. In the industrial automation field, such component assemblies are commonly referred to as motor control centers (MCC's).

In addition to the component assembly and network, system 10 includes a system controller 16 and a monitoring station 18. System controller 16 may, in fact, be defined by various devices both within and external to the component assembly, and may comprise computer systems connected to the component assembly via network 14. Where included in the system, system controller 16 may store programs, routines, control logic, and the like for regulating operation of the components of the system. Monitoring station 18, described in greater detail below, may be local to or separate from system controller 16. The monitoring station permits operational status and parameters to be monitored in real time, and affords programming of certain of the components of assembly 12. It should be noted that while a single assembly 12 is illustrated in the figures and described herein, the component assembly 12 may, in fact, include a range of assemblies, each located near one another or remote from one another in a particular application, interconnected with controller 16 and monitoring station 18 via network 14.

Network 14 may also permit data exchange with additional monitoring and control stations. For example, in the illustrated embodiment, a field engineer laptop 20 may be coupled to network 14 to produce representations of the system, monitor parameters sensed or controlled by the system, program components of the system, and so forth. Similarly, one or more gateways 22 may be provided which link network 14 to other networks 24. Such networks may use a similar or completely different protocol from that of network 14. The other networks 24 may include various remote devices, as indicated generally by reference numeral 26, which permit remote monitoring and control of components of the system. One or more of the control or monitoring stations in the system may be adapted to be linked to outside elements by wide area networks, as represented generally at reference numeral 28, including the Internet. Thus, monitoring station 18 may access remote resources and monitoring equipment 30 via wide area network 28, as described more fully below.

It should be noted that, while reference is made herein to a wide area network 28, other network strategies may be implemented in the system, including virtual private networks, dedicated communications links, and so forth. While any suitable network 14 may be used in the system, in a present embodiment, an industry standard network is employed, referred to commonly under the name DeviceNet. Such networks permit the exchange of data in accordance with a predefined protocol, and may provide power for operation of networked elements.

Component assembly 12 comprises a range of components, designated generally by reference numeral 32. The components are situated in an enclosure set 34 which may include a single or a plurality of separate enclosures. The enclosure set 34, in the illustrated embodiment, includes sections 36 in which subunits or sub-assemblies of the component assembly are situated. In practice, the enclosure set may be defined by a large enclosure in which individual panel-mounted subunits are positioned in bays 38. Between each of the sections or bays, wireways 40 serve to channel wiring, including trunk and drop cabling for network 14. As will be appreciated by those skilled in the art, one or more power busses 42 serve to convey electrical power to the enclosure, which is routed to each of the components to regulate the application of the power to downstream loads, such as electric motors, valves, actuators, and so forth.

Components 32 generally include both an operative device, designated generally by the numeral 44, along with network interface circuitry 46, and load-line interface circuitry 48. While reference is made herein, generically, to a component device 44, it should be noted that in an industrial automation context, such devices may include any or all of the power regulation devices mentioned above, as well as others. In general, the devices may serve to regulate any useful industrial process or load, and may be configured to function in cooperation with one another, such as to protect the other components from overcurrent conditions, loss of phase, ground fault, or any other abnormal or unwanted condition. In normal operation, the devices function in accordance with a predetermined routine or program, either stored within the devices themselves, in memory of a programmable logic controller, or in memory of a system controller 16. Moreover, operation of the devices may be regulated in accordance with parameters sensed by the components themselves, or by system sensors. Finally, operation of the devices may be regulated by operator-induced command inputs, including inputs made via a computer interface, push buttons, switches, or in any other suitable manner.

The components may be configured for direct connection to the data network 14, or may require connection to the network a translator 50. In the illustrated embodiment to FIG. 1, translator 50 serves to communicate data to and from a downstream device 52 which is not equipped for directly receiving and transmitting data via the network. As noted below, the components preferably include dedicated memory objects which facilitate certain of the monitoring and control functions of the system. Where a downstream device 52 does not include such objects, or is not equipped for data communications in accordance with the network protocol, a translator 50 may, instead, include the necessary memory objects, and serve to take on the identity of the downstream object from the point of view of the data network, translating data from the device in accordance with a second protocol as defined by the device, such as a CAN protocol known as SCANport in a present embodiment. In such cases, the translator 50 includes a device interface 54 which communicates with the downstream device 52 in accordance with the second protocol. Translator 50 may further include input/output interface circuitry 54 for transmitting and receiving information with other devices of the system. While not illustrated in FIG. 1, certain of the components 32 may include similar input and output interface circuitry, permitting them to similarly exchange information with external devices of the system.

When positioned in the enclosure set 34, the components, devices, translators, and other elements of the system, may be represented as having specific locations or coordinates 58 and 60. In the illustrated embodiment, coordinate 58 represents a horizontal location of the components from a left-hand side of the enclosure set. Coordinate 60, on the other hand, represents the location of the components from a top side of the enclosure set. As noted below in greater detail, memory objects of each component or translator may store data representative of these coordinates to facilitate their location in the system, as well as to enhance certain of the monitoring and display functions of the system. In addition to coordinates 58 and 60, the components may include physical extent designations, such as size or space factors, designated generally by reference numeral 62, corresponding to the relative extent of a component or a subassembly within the enclosure set. As will be appreciated by those skilled in the art, coordinates 58 and 60, and factors 62 may permit the components to be accurately located and depicted in the system as described below.

Monitoring station 18 includes a computer console 64 in which various types of memory supports 66 may be employed, such as magnetic or optical memory devices (e.g., CD ROM's). The computer console 64 is adapted to cooperate with peripheral devices, such as conventional computer monitor 68, and input devices such as a keyboard 70 and mouse 72. Moreover, the console 64 may cooperate with additional peripheral devices, such as a printer 74 for producing hard-copy reports.

Figure 2:
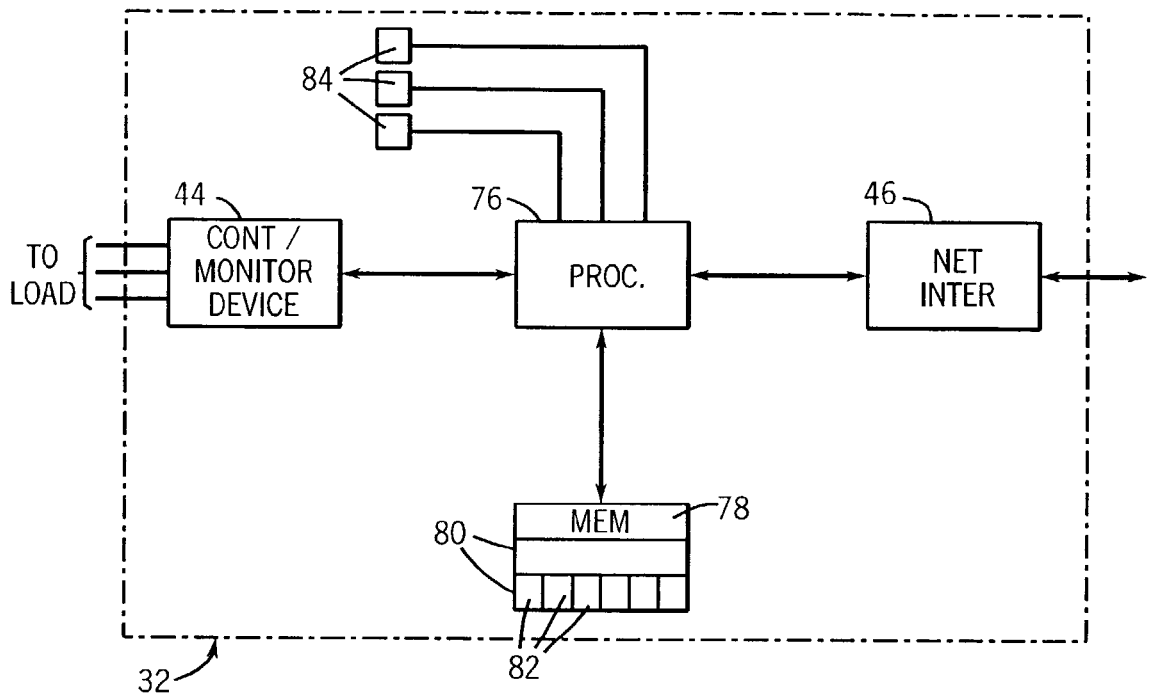
FIG. 2 is a diagrammatical representation of certain functional circuitry within a networked component in a system such as that shown in FIG. 1.

Certain of the functional circuitry contained within each component 32 is illustrated in FIG. 2. As noted above, each component 32 will include a control or monitoring device 44, such as a conventional device for regulating application of electrical power to a load. The devices, when adapted to regulate power in this way, may include single or multiphase arrangements, and may operate on mechanical, electromechanical or solid state principles. A network interface circuit 46 permits the exchange of data between the component and other devices coupled to network 14 (see FIG. 1). Network interface 46 will be adapted to encode data in accordance with the protocol of the network, such as the DeviceNet protocol mentioned above. The components further include a processor 76 which communicates with the control and monitoring device 44 and the network interface 46 to control operation of the component, and to provide access to and exchange of data representative of states, parameter levels, and so forth, controlled by or monitored by device 44. Processor 76 is associated with a memory circuit 78, which will typically include a solid state, resident, non-volatile memory which is embedded and maintained on-board the component 32.

As discussed more fully below, memory circuit 78 includes one or more dedicated objects 80 which are allocated for specific data representative of the system, the component, the component function, the component location, and so forth. Thus, memory objects 80 include sectors or blocks 82, typically each comprising a plurality of bits, for storing code representative of the designated data. Processor 76 may also receive inputs from sensors 84 which are external to device 44. Both device 44 and sensors 84 may serve to sense any suitable operational parameters, such as current, voltage, frequency, speeds, temperatures, and so forth.

Figure 3:
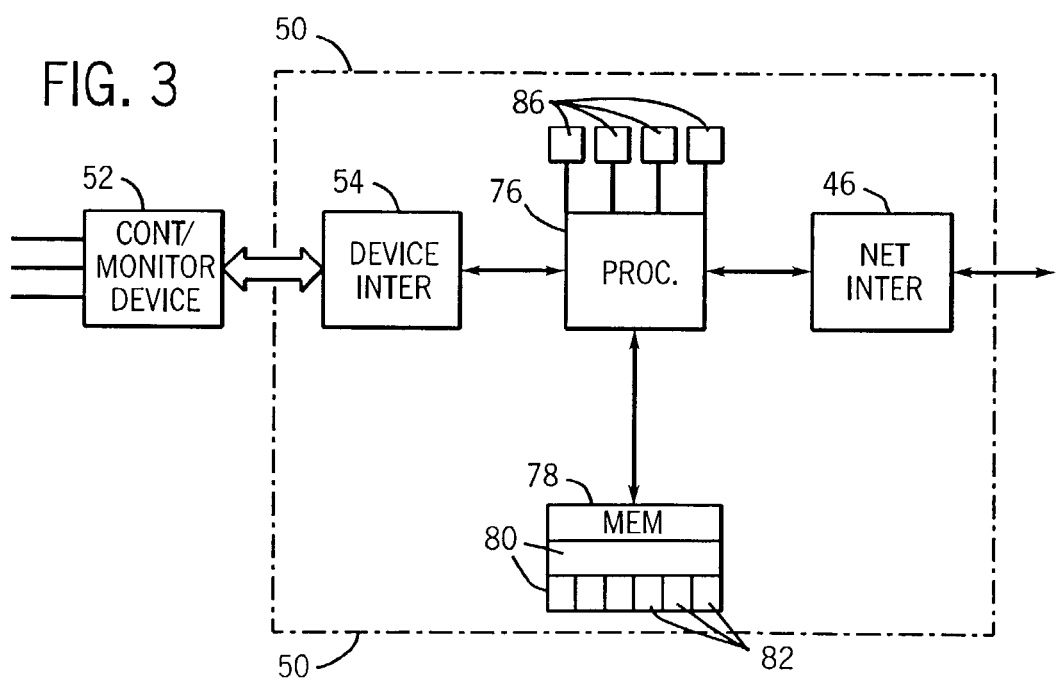
FIG. 3 is a diagrammatical representation of components of a translator module for use with non-networkable or non-programmable, components in a system such as that shown in FIG. 1.

Similar functional circuitry is included within each translator 50, as illustrated generally in FIG. 3. As with components 32 (see FIG. 1), translators 50 include a processor 76 which cooperates with a network interface circuit 46 to exchange data between the translator and other elements of the system. Processor 76 also operates in conjunction with a device interface 54 which is adapted to exchange data between the translator and a control or monitoring device 52, which is either not programmable as desired in the network or networkable in accordance with the protocol of network 14 (see FIG. 1). Moreover, processor 76 is linked to a memory circuit 78 which stores routines carried out by the processor, as well as dedicated memory objects 80 as described above. Finally, translators 50 may include one or more input/output nodes or terminals 86 for exchanging data with other elements or devices (not shown) and the network. By way of example, input/output nodes 86 may permit linking of the network to various sensors, actuators, and the like. Where desired, as in a present embodiment, translators may accommodate inputs only, or neither inputs nor outputs. Moreover, in a presently preferred embodiment, DIP switches (not shown), allow for selection of one of multiple operating voltages for the translator 50, including 24 VDC, 115 VAC and 230 VAC.

Figure 4:
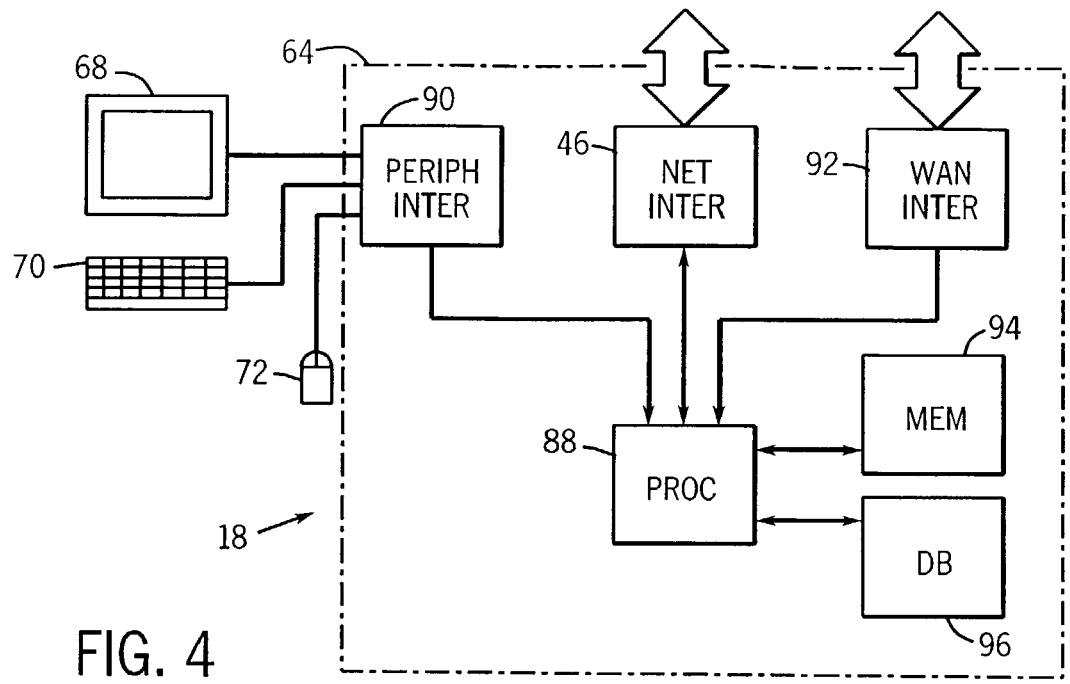
FIG. 4 is a diagrammatical representation of functional elements included in a monitoring station designed to access data from components in a system such as that shown in FIG. 1 and to display data relating to component status and operating parameters.

Monitoring station 18 may include, as a software platform, any suitable processor or computer workstation. As illustrated in FIG. 4, the computer 64 includes a processor 88, such as a Pentium III processor available from Intel. Processor 88 carries out instructions and manages collection and display of operational parameters in the form of user viewable representations as described below. The processor thus communicates with a network interface 46 in a manner similar to the interfaces included within each component, linking the monitoring station to network 14 (see FIG. 1). Moreover, processor 88 communicates with its associated peripheral devices via a peripheral interface 90. A wide area network interface 92 is included within the monitoring station, and may include any suitable network circuitry, including a dial-up modem, a cable modem, a wireless modem or other network circuit. A memory circuit 94 is provided within computer 64, and may include a range of memory devices, such as solid state memory chips, magnetic disk drives, hard drives, and CD ROM drives.

Figure 5:
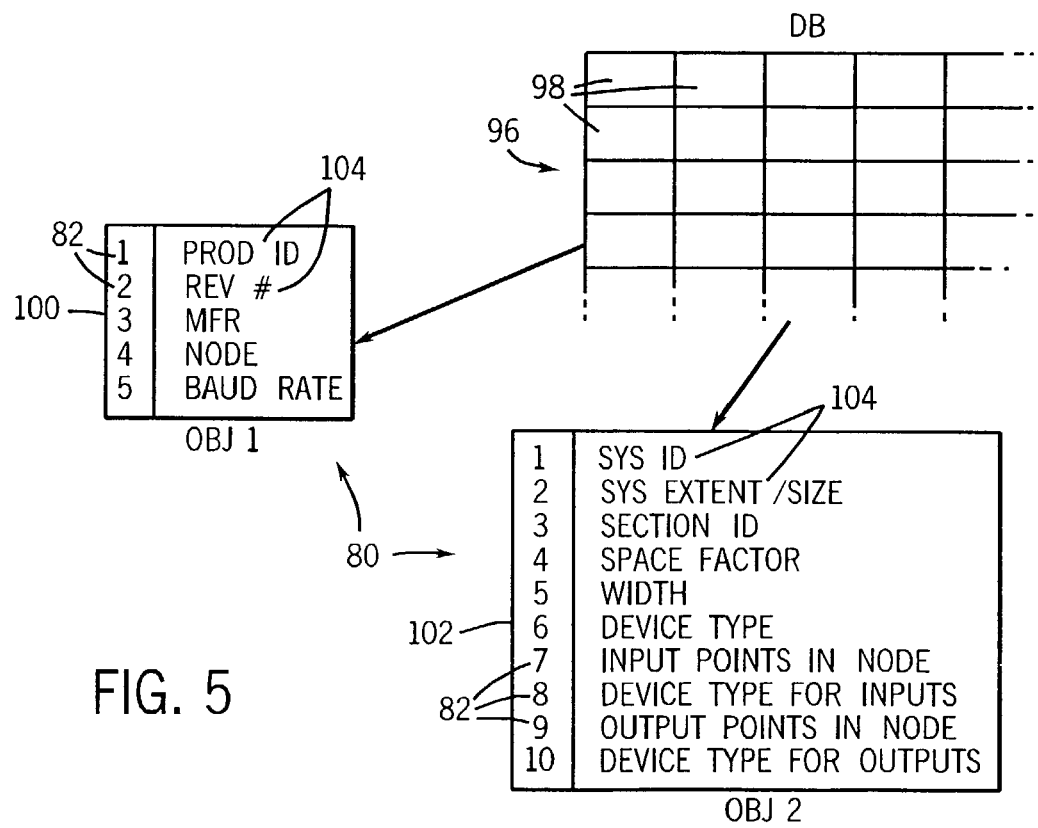
FIG. 5 is a diagrammatical representation of certain dedicated memory objects included in programmable components of the system of FIG. 1 for storing portions of a database distributed among the components and including data for designating the system, the components, and so forth.

Referring to FIG. 5, a database 96 is stored within computer 64, and, in practice, may be included within one or more of the memory circuits 94. Due to the nature of the database and its functions in the system, however, separate reference is made herein to the database and the information contained therein. As noted below, processor 88 relies upon database 96 for many of the control or monitoring functions, including communication with the system components, programming or reprogramming of the system components, generation of user viewable representations of the system, and so forth.

Database 96 serves as the foundation for programming of memory objects within the components and translators of the system. In a present embodiment, the database is established during system design, but may be modified subsequently depending upon system requirements and system redesigns. The database includes entries 98 designating the system, the components in the system, physical and configuration parameters of the components, textual labels for user viewable representations, system settings, events, and so forth as described in greater detail below. The database also serves as the source for data stored within the memory objects of each component and translator.

As illustrated in FIG. 5, at least two such objects are preferably included within the components and translators. A first object 100 is configured at the time of manufacturing of the component, or subsequent to manufacturing and during installation of the component in the final system. Such memory objects will preferably include blocks 82 allocated by specific bits for encoding data 104 representative of the component identification. As illustrated in FIG. 5, the block data 104 of object 100 preferably includes code identifying the product itself, the revision number of the product, if any, a manufacturer of the product, a network node designation, and a data exchange baud rate. Again, the code needed to populate each of the allocated blocks 82 may be stored within database 96 and may be altered as needed. In a present embodiment, data downloaded into the components is derived from database 96 by reformatting the data to conform to the allocated blocks 82.

A second memory object 102 stores additional data derived from database 96. Such data remains resident within each component or translator following system assembly. The block data 104 of memory object 102 includes code which identifies or designates the system, the components, and physical location or configuration information for the components. Moreover, object 102 preferably includes allocated memory for configuration of input or output nodes coupled to the network via the component. In the illustrated embodiment, object 102 includes code representative of a system identification, a system extent or size, the identification of a section within which the component is located, a size or space factor, a width factor, a device type, a number of input points within the node, a device type for each of the input points, if any, a number of output points in the node, and designations for device types of any outputs, if any. It should be noted that certain components or translators may accommodate inputs only, outputs only, or neither inputs nor outputs.

In general terms, the system identification code and system extent or size code is representative of the system in which the components are located. Because many applications may include several such systems, this data aids in monitoring and viewing component information by individual system. The section identifications, space factor and width information, generally corresponding to the coordinates 58 and 60, and to the size factor 62 discussed above with reference to FIG. 1, aid in locating the components within the system for physical layout representations as described below. The device type information may include data representative of the physical or wiring configuration of the components, such as code representative of full voltage, non-reversing motor starter, three-phase overload relay, and so forth, by way of example. Finally, the input and output configuration fields are provided in sets, in accordance with the number of inputs and outputs interfaced at the node.

Figure 6:
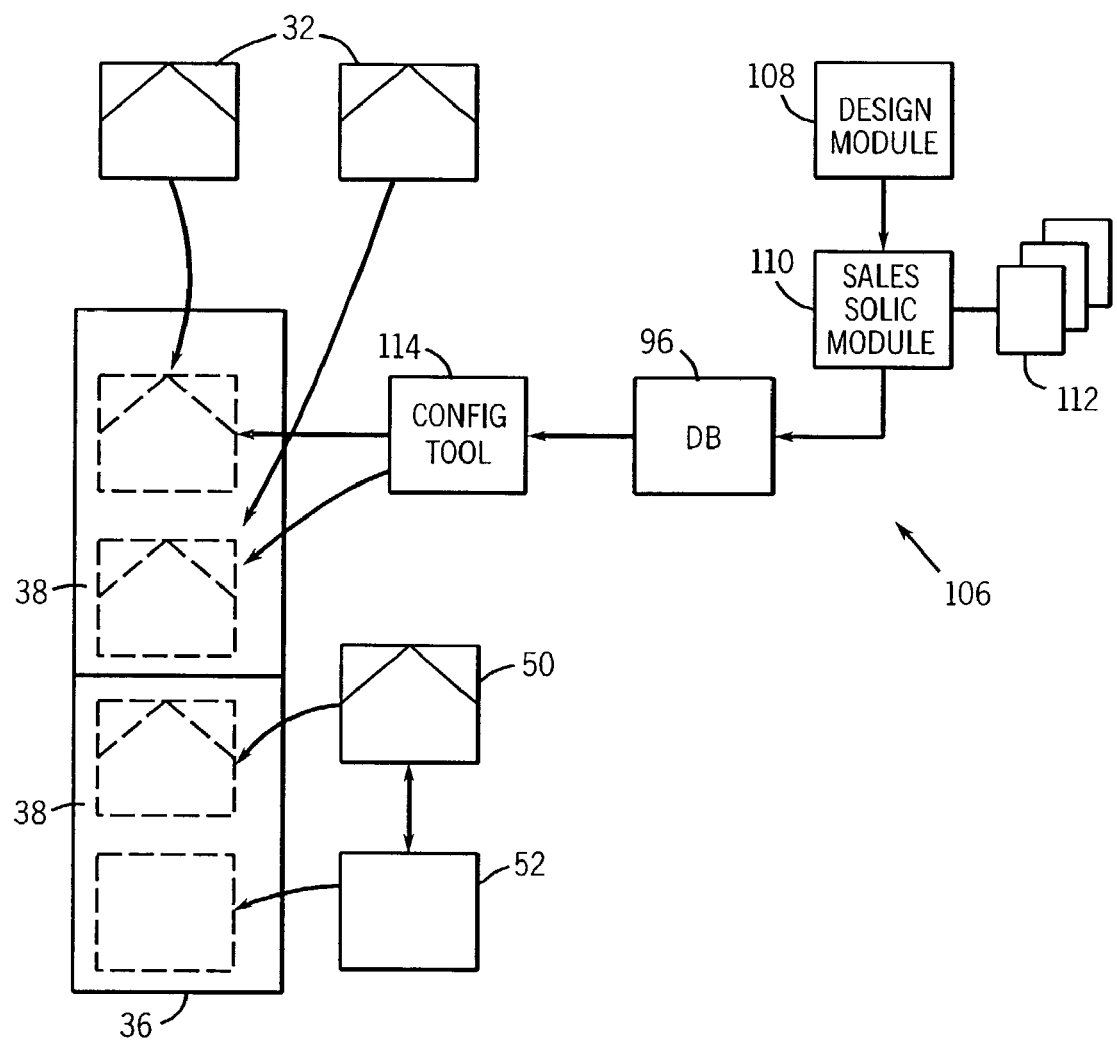
FIG. 6 is a diagrammatical representation of functional components in an integrated design, sales, and programming arrangement for implementing a distributed database in a system such as that illustrated in FIG. 1.

As noted above, data which populates each dedicated memory object of the components or translators is preferably stored in the objects during initial configuration, but may be modified subsequent thereto. In accordance with certain aspects of the present technique, an integrated design, sales, and manufacturing system permits the database 96 to be used for a number of purposes throughout the life of the system, from its initial design to its final implementation. FIG. 6 represents functional blocks in a configuration system 106 designed for this purpose.

As illustrated in FIG. 6, individual components 32 are designed into the system, and are intended for location within specific sections 36 and bays 38 of the enclosure set. The sections and bays may include translators 50 and their associated downstream devices 52, particularly where the downstream devices are not designed to interface with the system data network, or where the downstream devices do not include the dedicated memory objects described above. The configuration system 106 includes a design module 108 which may comprise software and hardware for developing an initial system design. The design module 108, for example, will typically include one or more computer workstations on which software is provided for producing system layouts and configuration information. The design module accesses additional information, such as pricing information, availability information, configuration data, serial numbers, model numbers, and the like, for generation of database 96. Based upon database 96, a sales solicitation module 110 uses the same database data entries for generation of a sales solicitation proposal 112. In general, proposal 112 will be a textual document (including, where desired, diagrams, schematics and so forth), which sets forth specifications for the components defined in database 96, as well as their implementation within the system. The sales proposal 112 may also include information relating to delivery times, programming, pricing, and so forth.

In accordance with the present technique, the database established in accordance with the design set forth by the design module 108, and used by the sales solicitation module 110 for generating proposal 112 then serves to configure the actual objects contained within the components and translators of the system. A configuration tool 114, referred to in the system as a "configurator," serves to extract data from the database needed to populate each dedicated memory object of the components. As summarized below, the configurator may be linked to the components prior to their assembly in the system, or during their mounting within the individual sections or bays which are subsequently placed within the enclosure set. Thus, the configurator may be linked to the components via a temporary network link to address the memory locations of the objects, and to download the corresponding entries from database 96 into the objects. Alternatively, the configurator may be linked to the components following partial or final assembly of the system, such as through the data network 14 discussed above.

Figure 7:
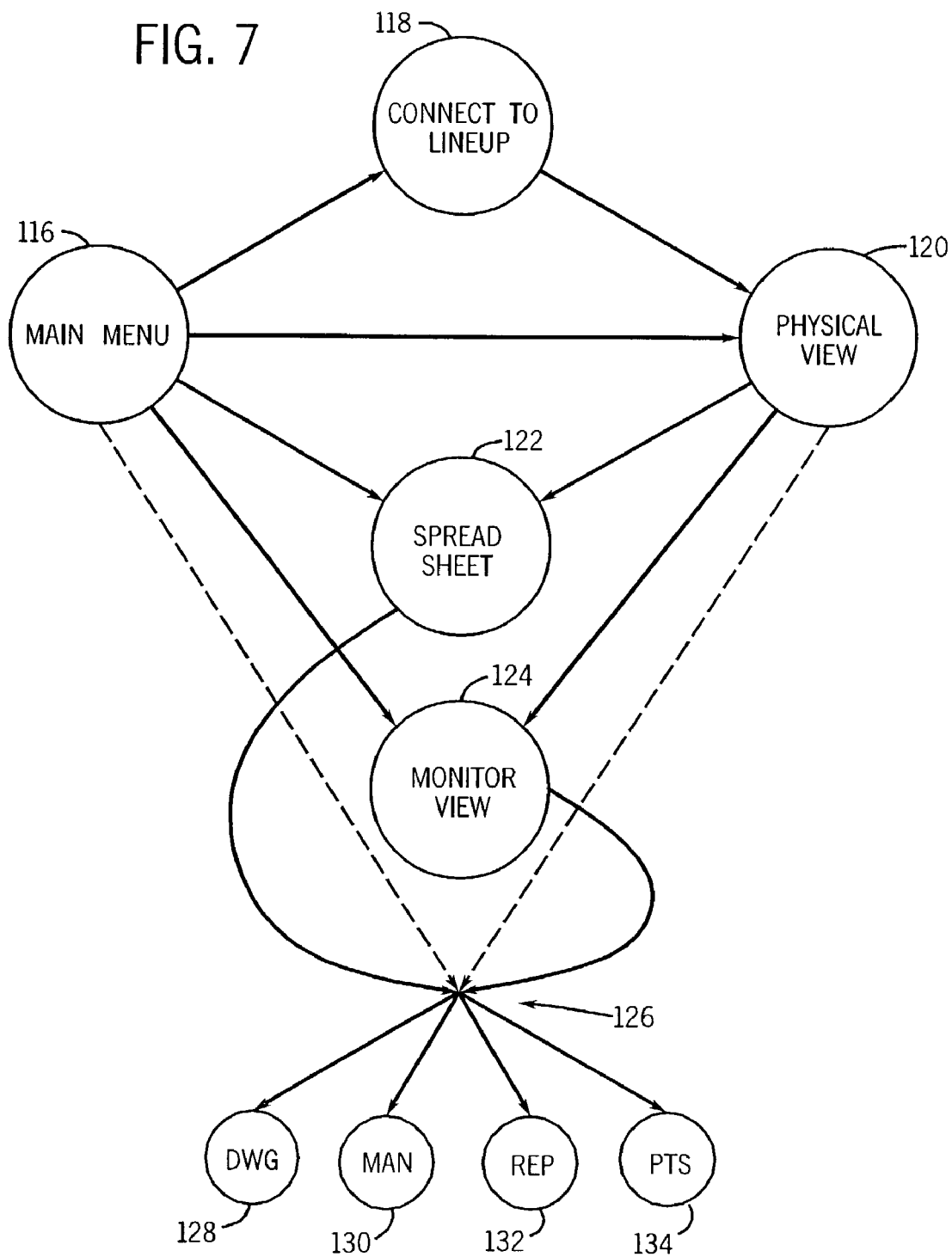
FIG. 7 is a diagram illustrating links between user viewable pages or representations in a monitoring station linked to a control and monitoring system.

The processor of monitoring station 18 (see FIG. 1) executes software for cyclically polling the components of the system via network 14. The software also serves as the basis for generating a series of user viewable representations or screens depicting the system, component configuration information, monitored parameter levels, and so forth. FIG. 7 represents the association of various views available to a user in accordance with a present embodiment of the routine. The routine illustrated in FIG. 7 includes a main menu 116 from which a variety of representations may be accessed. For example, from main menu 116 a user may connect directly to the line-up or component assembly 12 illustrated in FIG. 1, as indicated at reference numeral 118 in FIG. 7. From the main menu or from the lineup connection link, a physical view may be selected as indicated at reference numeral 120. As described more fully below, the physical view provides a dimensionally and dispositionally approximate layout the system and components reconstructed from data acquired from the various components and translators. A spreadsheet view 122 may be selected from either the main menu or the physical view 120. The spreadsheet view, as described below, includes data entries, again drawn from database 96 (see FIG. 6), representative of the components, their identifications, their settings, their locations, and so forth. A monitor view 124 is provided for each component or device. The monitor view, also described below, provides for descriptions of the components, and may include images of the components, as well as graphical displays of current and historical parameter levels.

In addition to the menus and views summarized above, the software operative on the monitoring station also preferably affords easy access to a variety of support documentation, from a node point in FIG. 7 represented by reference numeral 126. The support documentation may include electronic files stored at the monitoring station, in resident memory of the monitoring station or in any memory medium (e.g., CD ROM) usable at the monitoring station, but may also include data files stored remote from monitoring station, such as at remote resources as discussed above with FIG. 1. In a present embodiment, a wide range of support documentation may be accessed directly from the user viewable representations. For example, the data files may include system or component drawings 128, manuals 130, reports 132, and parts lists or breakdowns 134. The support documentation is preferably referenced at the creation of the system, such as through database 96 as discussed above. Thereafter, the documentation is stored for ready access via software links through the views accessible on the monitoring station. Thus, the data files for the support documentation may be referenced directly at the monitoring station without interrupting the monitoring or control functions carried out by the processor.

It should be noted that the software summarized above with reference to FIG. 7 may include additional or other screens, links, representations, and functionalities. Moreover, the software may be designed to operate in conjunction with additional software for other purposes, and may be multi-tasked with other software, such as browsers, spreadsheet applications, text editing applications, and so forth.

Figure 8:
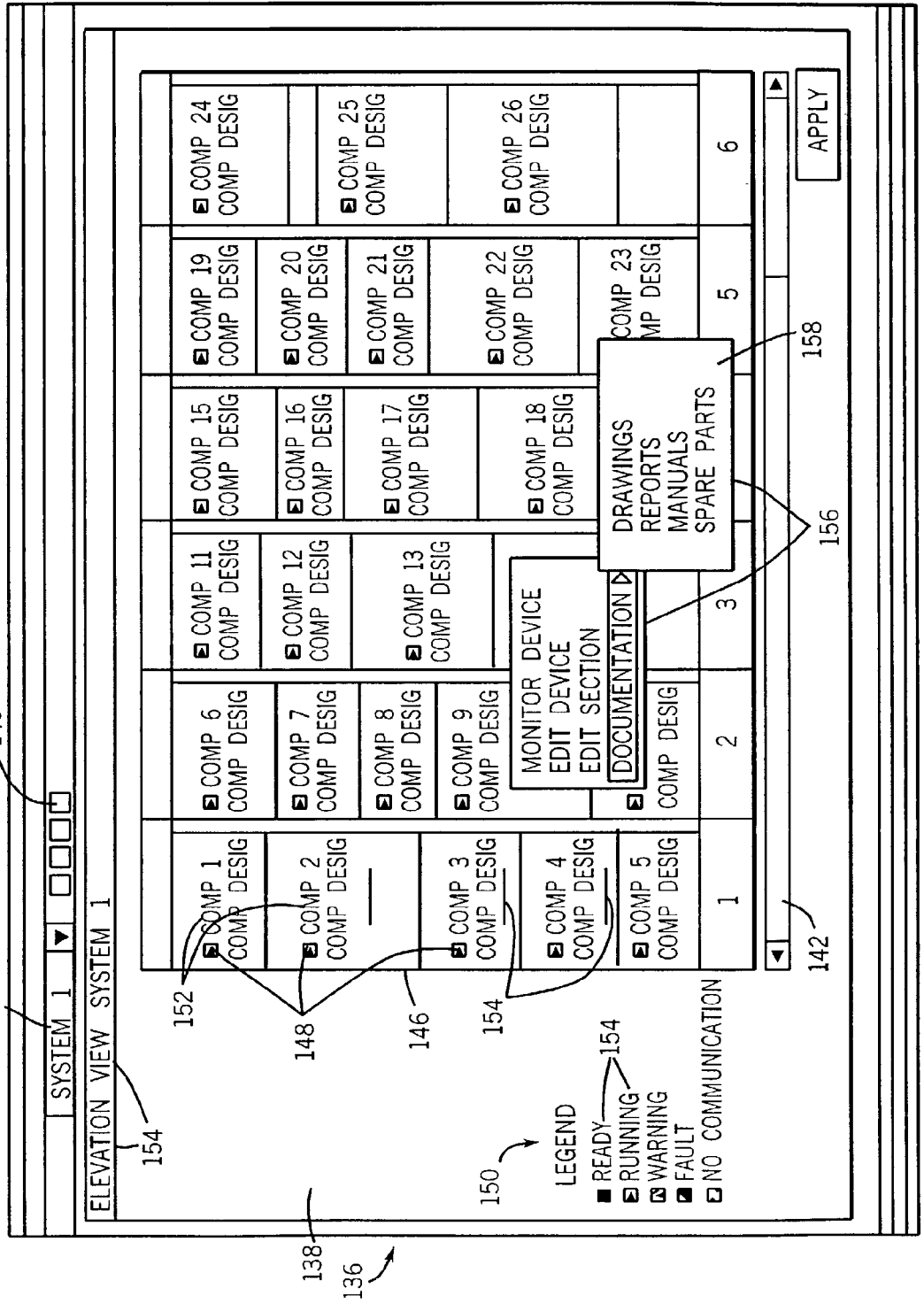
FIG. 8 is an elevational or physical layout view of a system of the type shown in FIG. 1 in an exemplary embodiment of software running on a monitoring station.

FIGS. 8–13 illustrate certain user viewable representations accessible on the monitoring station in accordance with the aspects of a present embodiment. As noted above, an extremely useful feature of the present system is the ability to build, in real time, an approximately accurate physical layout view or representation of the system and components based upon information stored within the dedicated memory objects of the components themselves. FIG. 8 represents a user viewable representation 136 which includes a page or screen 138 viewable on the monitor 68 (see FIG. 1) of the monitoring station. In the illustrated embodiment, the screen includes navigational bars or tools 140, such as virtual buttons which may be selected or actuated by an operator via an input device such as a conventional mouse. A scroll bar 142 is provided for moving between sections or portions of the system illustrated in the representation. A system label 144 designates which system is being viewed, and is based upon the system designation data stored within the memory objects of the components.

In the physical representation of FIG. 8, a depiction 146 is provided of the physical layout of the component assembly. In the illustrated embodiment, this depiction is approximately accurate in terms of the relative disposition of the components in the system, their coordinates in the system, and their relative sizes. The relative sizes and locations of the component representations in depiction 146 are based upon data stored within the memory objects of the components. In particular, as noted above, the memory objects of each component or translator include data indicative of the component locations, their sizes, and so forth. Based upon this data, the physical depiction 146 can be reconstructed, even without specific information or preprogramming of the depiction within the monitoring station. Moreover, each component representation in the depiction 146 preferably includes a status indicator 148 for identifying a current status of the respective component. A legend 150 provides the user with a translation of the meaning of each status indicator. Component textual labels 152 are provided for each component representation. The component textual labels are also based upon component data acquired from each component. Again, the component data is stored within the memory objects described above, and is used as a reference for extracting the component textual labels from the database.

It will be noted that the representations described herein, including the representation of FIG. 8, include a series of textual labels, such as for the components, their designations, legends, view identifications, and so forth. All such textual labels, designated generally by the reference numeral 154, are preferably stored as entries within database 96 (see FIG. 6) as described more fully below. Thus, in addition to the other functions of the monitoring station, the various representations available on the monitoring station may be viewed in one of a plurality of selectable languages by reference to specific textual labels stored within the database. Moreover, the representations include a series of links 156 which may be accessed by the user in various ways. For example, in a present embodiment, links may be accessed via navigational tools 140, or by selection of specific components in the depiction 146. In the embodiment illustrated in FIG. 8, such links may include monitoring representations, component data editing tools, system section editing tools, and documentation. As noted above, several types of documentation or support information may be accessed, such as via additional document links 158.

Figure 9:
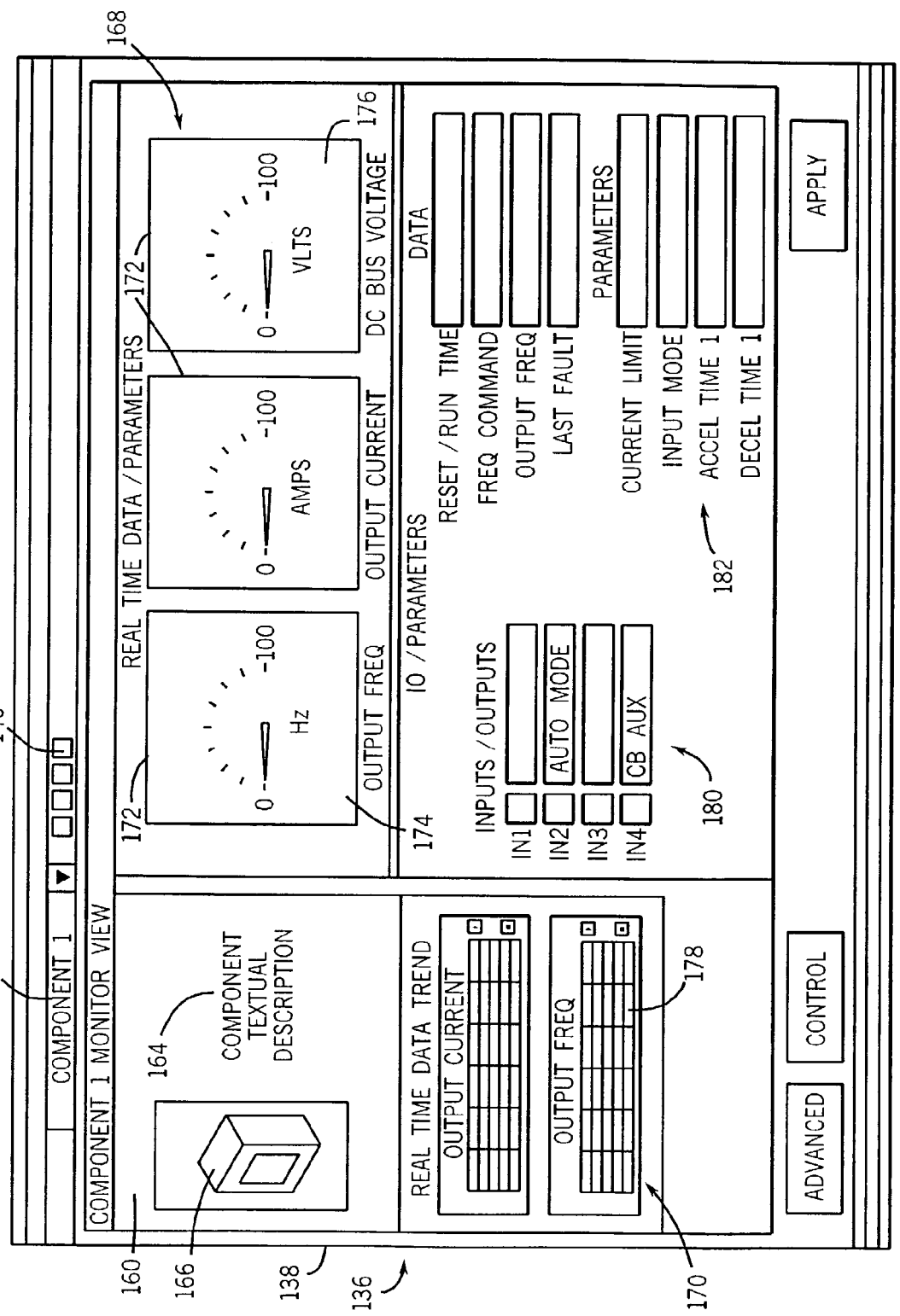
FIG. 9 is a device monitoring view accessible from the elevational view of FIG. 8 for certain of the programmable components.

FIG. 9 represents a monitor view for the components of the system accessible from the physical representation of FIG. 8. The monitor representation 160 includes series of features which inform the user of parameter status, component status, component settings, and so forth. In the illustrated embodiment, the monitor representation includes a component designation or label 162, derived from information stored within the memory object of a desired component selectable by the user. Based upon the component identification, the monitor representation 160 presents a textual component description 164 which includes basic information on the component and its operation. An image 166 of the component is provided to aid in visual recognition of the component in the event of needed servicing.

The monitor representation 160 of FIG. 9 also includes a range of parameter representations, indicating current levels of operating parameters, as indicated at reference numeral 168, and historical levels, as indicated at reference numeral 170. The specific parameters represented in the screen are preferably selected based upon the component identification, its operation and function in the system, and defaults stored for the component. In the illustrated embodiment, the current level indications include a series of virtual meters 172 which indicate levels of the default parameters, as indicated at reference numeral 174, or of operator selected parameters, as indicated at reference numeral 176. In the illustrated embodiment, the default parameters include output frequency, while a user selected parameter is bus voltage. Because many of the components of the system are capable of monitoring and controlling a wide range of parameters, key default parameters are selected in advance, depending upon the configuration and function of the respective components, while the operator may override the defaults and select the other parameters from pull down menus, or similar tools.

In addition to the indication of current parameter levels, the monitor representation 160 includes displays of historical parameter levels. The historical displays may take any convenient form, and in a present embodiment imitate conventional strip chart output as indicated at reference numeral 178 in FIG. 9. Again, the particular parameters traced in the strip chart output, or any other suitable historical presentation, may include default parameters for the particular component, or operator-selected parameters.

The monitor representation 160 may further include textual representations of various settings, configurations, and so forth, for the particular component. In the embodiment illustrated in FIG. 9, the component includes inputs and outputs, with appropriate interfacing circuitry within the component. The configurations of the inputs and outputs are provided in the memory objects as discussed above. The monitoring station accesses this data and provides information on the inputs and outputs as indicated at reference numeral 180. Finally, the monitor representation illustrated in FIG. 9 includes textual or numerical indications of particular parameter levels, settings, times, frequencies, or any other suitable set points or level indications. As indicated by reference numeral 182, these may include both text and parameter levels, with appropriate textual labels for each.

The various views created and displayed in accordance with the present technique include a variety of textual descriptions and labels which may be displayed in various languages as desired by the user. In a present embodiment, the multilingual aspect of the representations is facilitated by the inclusion of language entries for each label, stored within database 96 (see FIG. 6). The user may select a language selection tool from a menu, such as a preference menu of the type illustrated in FIG. 10. Within the menu, a language tab allows the user to select the desired language, and the various language selections may be translated, themselves, into other languages for selection.

Figure 10:
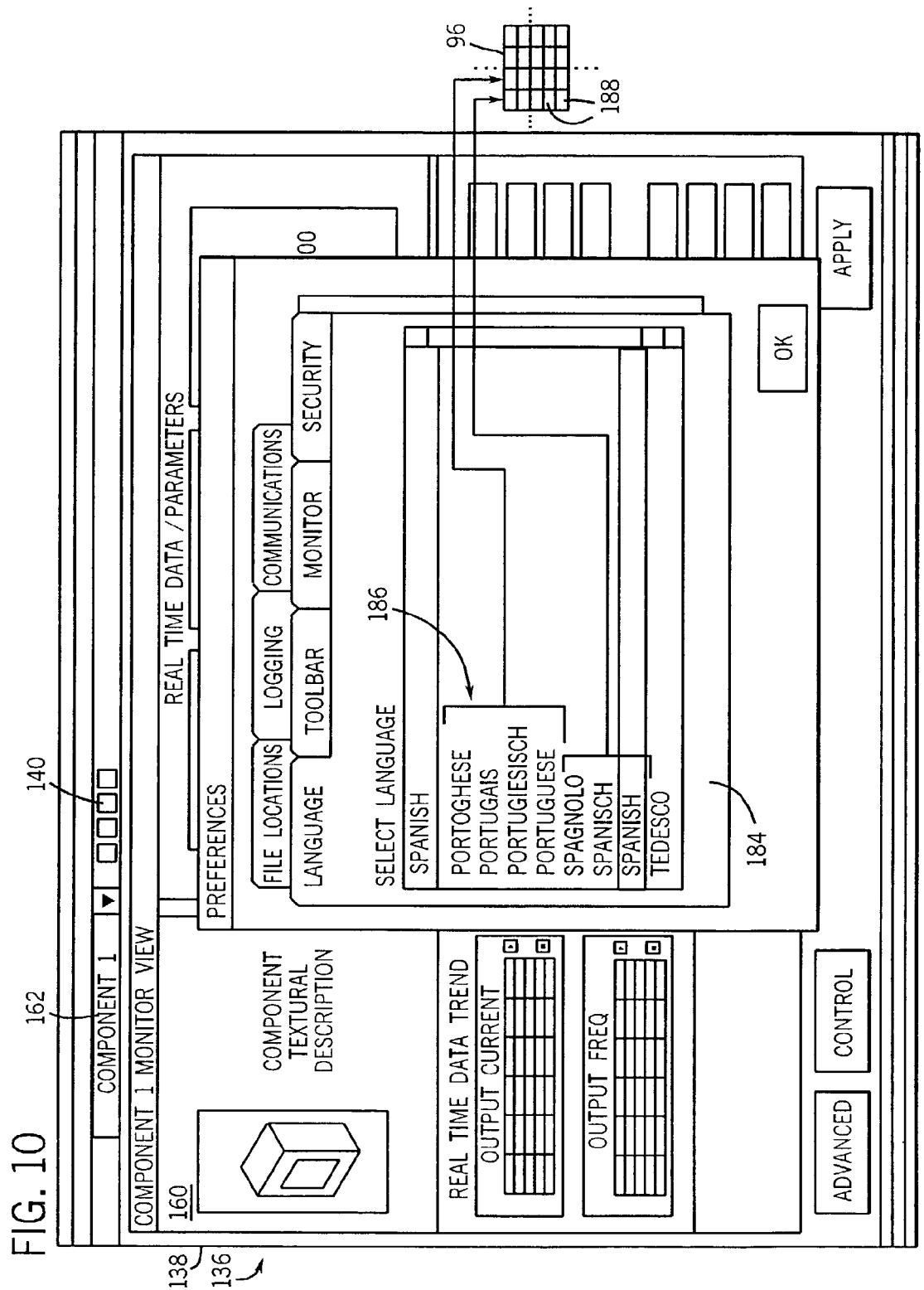
FIG. 10 is a view of one of the user viewable representations, such as that of FIG. 9, and illustrating the real time selection of a desired language for textual labels stored and accessible from the system database.

In the embodiment illustrated in FIG. 10, a user selects a desired language, such as Spanish, from a dropdown menu 184. The languages are displayed within the menu, and are selected via an input device, such as a conventional computer mouse. The list of languages, identified by reference numeral 186 in FIG. 10, allows for selection of any desired language for which textual translations are stored within database 96. Once a selection is made, the program automatically begins to draw all textual labels, descriptions, headings, and so forth from the appropriate entries 188 of the database 96.

The provision of the multilingual entries translated into the available languages in database 96 offers several distinct advantages. For example, the user may switch languages as desired during operation of the system, and without interrupting other functions of the system, such as real time monitoring and control. Moreover, the languages may be available for building real time views, including the physical view and the monitoring views at various locations accessible via a network interface as described above. A given system may thus be serviced remotely, such as by network connection to a different country or location. Furthermore, the provision of languages in translation as entries within the database permits the software to be provided in a single version and easily upgraded by simply allowing for access to a subsequent series of entries in the database, with corresponding options in the language menu.

Figure 11:
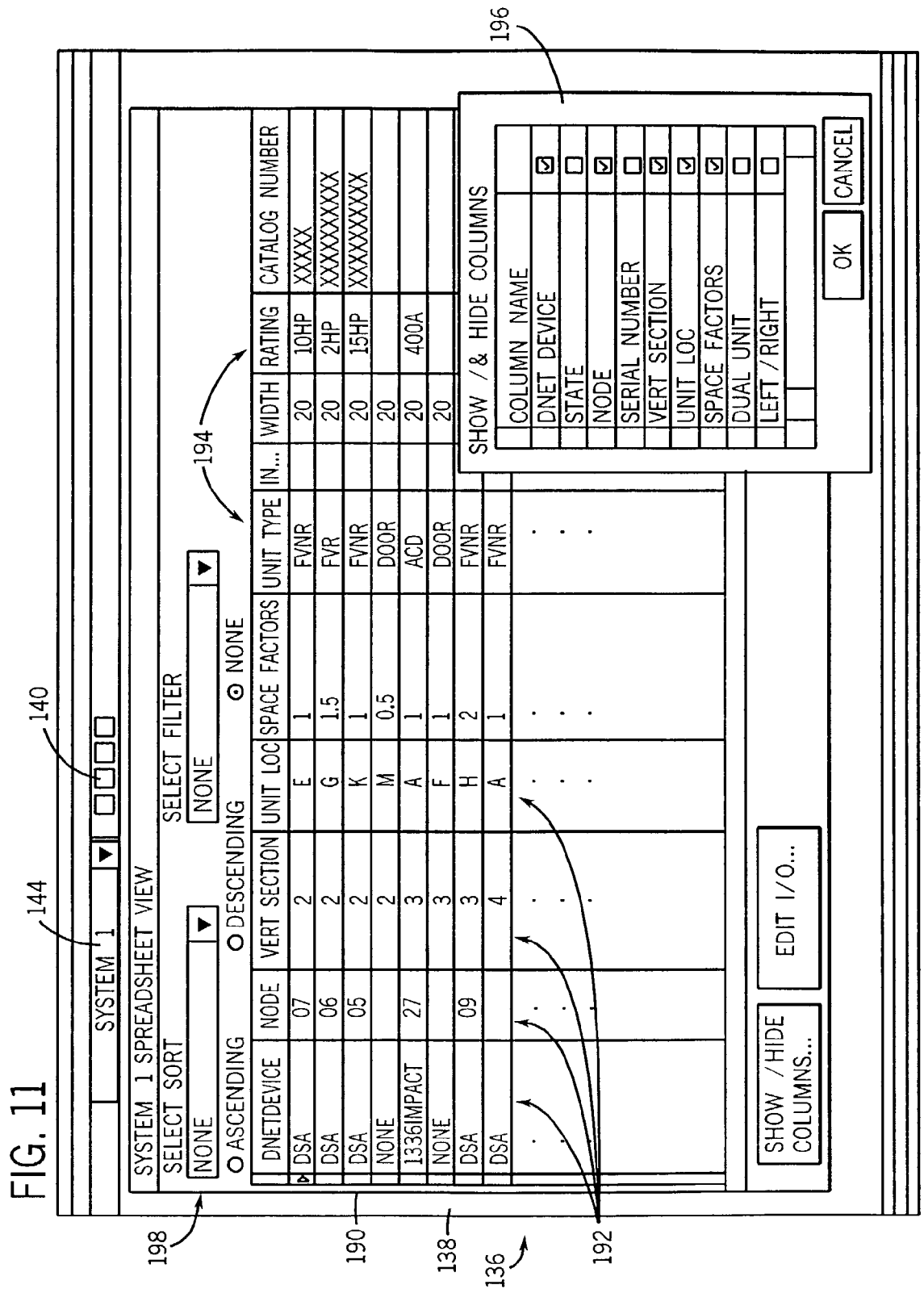
FIG. 11 is a spreadsheet view for component operating parameters and settings accessible from the physical view of FIG. 8.

In addition to the foregoing views, the present technique provides a spreadsheet-type representation or page which may be organized for each component, or for the entire system as illustrated in FIG. 11. In the representation of FIG. 11, the spreadsheet view 190 is referenced by system identification as indicated at reference numeral 144 based upon the information stored within the memory objects of the components of the system. Within the spreadsheet view, textual entries are provided including component designation data 192, also accessed from the individual memory objects of the components. In the embodiment illustrated in FIG. 11, the component designation data includes a device type, a node address, a vertical section and a unit location, the latter to parameters providing coordinate information for the identified component. Additional component designation data 194 may be viewable in the screen, including, in the illustrated embodiment, information stored within the components and indicative of a hardware, software or wiring configuration. In the illustrated embodiment the unit type, for example, may include textual information referenced from the database and corresponding to function data stored within the memory objects. By way of example, the text "FVNR" may be provided to represent a component which is configured as a full voltage, non-reversing motor starter. Additional such configuration data may include component rating, catalog numbers, and so forth. To facilitate manipulation of the data, and to permit user-selectable displays, a menu 196 may be provided in which a user may select to display or not to display specific system or component data by column.

Because the system provided herein is designed to cyclically poll the components for their state and specific operational parameters, events for the individual components or for the entire system may be logged. FIG. 12 illustrates an exemplary event log 200 stored for the system identified in the window 144 based upon the memory object data stored in the components. The event log may include a range of event types, such as specific faults or abnormal operating conditions, normal operating conditions or events, changes in component settings, and so forth. In the embodiment illustrated in FIG. 12, the event log includes component designation data 202, referencing each component by the device serial number, again based upon the information drawn from the device memory objects. An event time 204 is provided for each log event. Additional event data, as indicated generally by reference numeral 206 provides an indication of the type of event which occurred. Additional data may be stored within the system and accessed via the event log, such as to provide even further descriptive information on the nature of the log events.

As noted above, the present system permits the real time monitoring, physical view construction, event logging, and so forth, with links directly to support documentation. FIG. 13 illustrates a series of windows accessed from the physical view of FIG. 8. As noted above, support documentation may be accessed in the system in any suitable manner, such as via dropdown menus which are accessible from the individual component representations in the physical view. Moreover, such selections may be available through virtual buttons or similar user actuatable features 140 in the various views. In the present embodiment, as shown in FIG. 13, a menu is displayed for the user upon selection of the documentation item from a menu, and specific additional menus may be provided for drawings, reports, manuals, and spare parts. The links to the support documentation are preferably based upon data stored within the various memory objects, particularly the device designation data. The document selection menu 208 is thus displayed, such as for manuals in the illustrated embodiment. Component designation data 210 appears for selection by the user. In the embodiment illustrated in FIG. 13, the component designation data includes an identification of the component location or coordinates, and the component configuration or function. Support documentation which is available for the component is indicated in an additional window 212. By selecting the links from this window, a user may access manuals for the specific components. As indicated above, the support documentation, including the drawings, reports, manuals, or spare parts lists are preferably stored in a memory medium useable directly in the monitoring station, such as a CD ROM disk or disk set, or in database 96. Certain of the documentation may be stored in systems or workstations external to the monitoring system, however, including in locations remote from the monitoring system and accessible via the data network, local area networks, wide area networks, and so forth. Upon selection of a specific document, the document is displayed, with the software calling the appropriate application for display of the document, including text editing programs, drawing programs, image display programs, and so forth.

Figure 14:
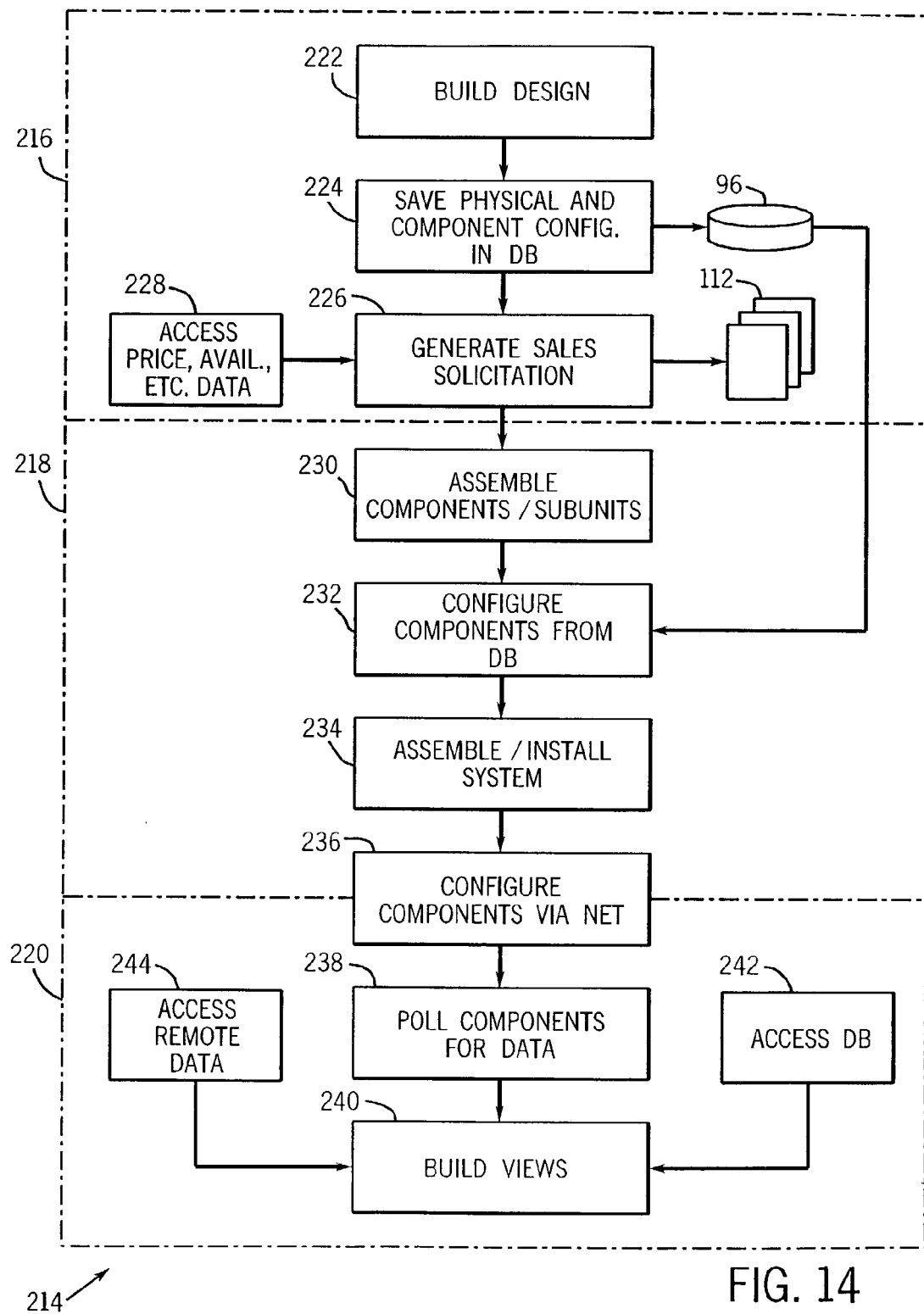
FIG. 14 is a flow chart illustrating exemplary logic in the design, assembly, programming, and operational phases of the system illustrated in the foregoing figures.

As noted above, the present technique permits an integrated system for designing, building, and utilizing electrical components in a programmable networked system, such as a motor control center. The technique includes, in the preferred embodiment, a database which is established during the design phase, and which is used as the basis for programming or configuring memory objects stored within the networked components and devices. FIG. 14 summarizes exemplary steps employed throughout this process.

As illustrated in FIG. 14, the process, designated generally by the reference numeral 214, includes several phases, including a design and sales phase 216, a manufacturing and configuration phase 218, and a utilization and monitoring phase 220. The first phase 216 begins with the design of the system as summarized at block 222. As noted above, system design may be based upon any suitable software application used for integrating the components into a cooperative system, and for generating any specifications required for verifying the operability of the design. At step 224, the physical and component configuration data is stored within a database. The database 96 is stored at this stage in the logic for use in soliciting sales of the system, and in the subsequent programming. As noted above, the database will serve as a platform for configuring the components, and will effectively be distributed among the components, at least in part, during the component configuration. At step 226 the design is used to generate sales proposal 112, which is also based upon the database. Step 226 may include incorporation of additional data external to the database, such as price information, deliver program (in general any suitable type of availability information), and so forth, for each component of the system. Step 226 produces a sales solicitation proposal 112, or similar document which may be used to establish the system specification, terms, and so forth.

Phase 218 in the process includes assembly of the components and subunits of the system, as indicated at step 230. The assembly may proceed by subunit or subassembly, such as in sections or "buckets" in certain types of system. Each subunit may therefore include one or more components which are mounted within the subunit and interconnected with wiring to permit their later incorporation into the system. At step 232 the components of each subunit are configured from database 96, such as by downloading database entries into the memory objects embedded within each component. At step 234 the components and subunits are assembled and installed in the system. In many applications, step 234 will include mounting of the actual components in system enclosure sets, along with any support connections and monitoring systems at a customer location. At step 236 the components may be further configured, such as via the data network described above. It should be noted that component configuration may occur at either step 232 or at step 236, or at both steps, depending upon the desired configuration data and the manner in which it is downloaded into the components. Thus, the configuration of the components may occur prior to assembly, during assembly, such as following partial assembly and subunits, or following system final assembly.

Phase 220, involving actual use of the system for monitoring and control purposes, may begin with step 236 in which the components are configured via the data network. Step 236 is also shown as at least partially included in phase 220 because, as summarized above, the memory objects may be designed for reprogramming or reconfiguring during use of the system. Such reconfiguration may be suitable where the component function is modified, inputs or outputs are added to specific components, a component location is changed, and so forth. The system may then function in accordance with a wide range of protocols and system architectures. In the summary of FIG. 14, components are cyclically polled for data as indicated at step 238. As noted above, this polling is done by the monitoring station to acquire component and system operation parameters as well as component designation data. At step 240 the various views discussed above are built by the monitoring station. The views may be built entirely from data accessed from the components, but are preferably also built based upon information accessed from the database as indicated at step 242. By way of example, the database may be used for providing specific language textual labels, component configuration data, settings, and so forth. The views may also incorporate data accessed remotely as indicated at step 244. Such remotely accessed data may include catalog information, drawings, trouble shooting information, or any other suitable data stored remote from the monitoring station and accessible via an appropriate network link.

Integration with Human Machine Interface

Figure 15:
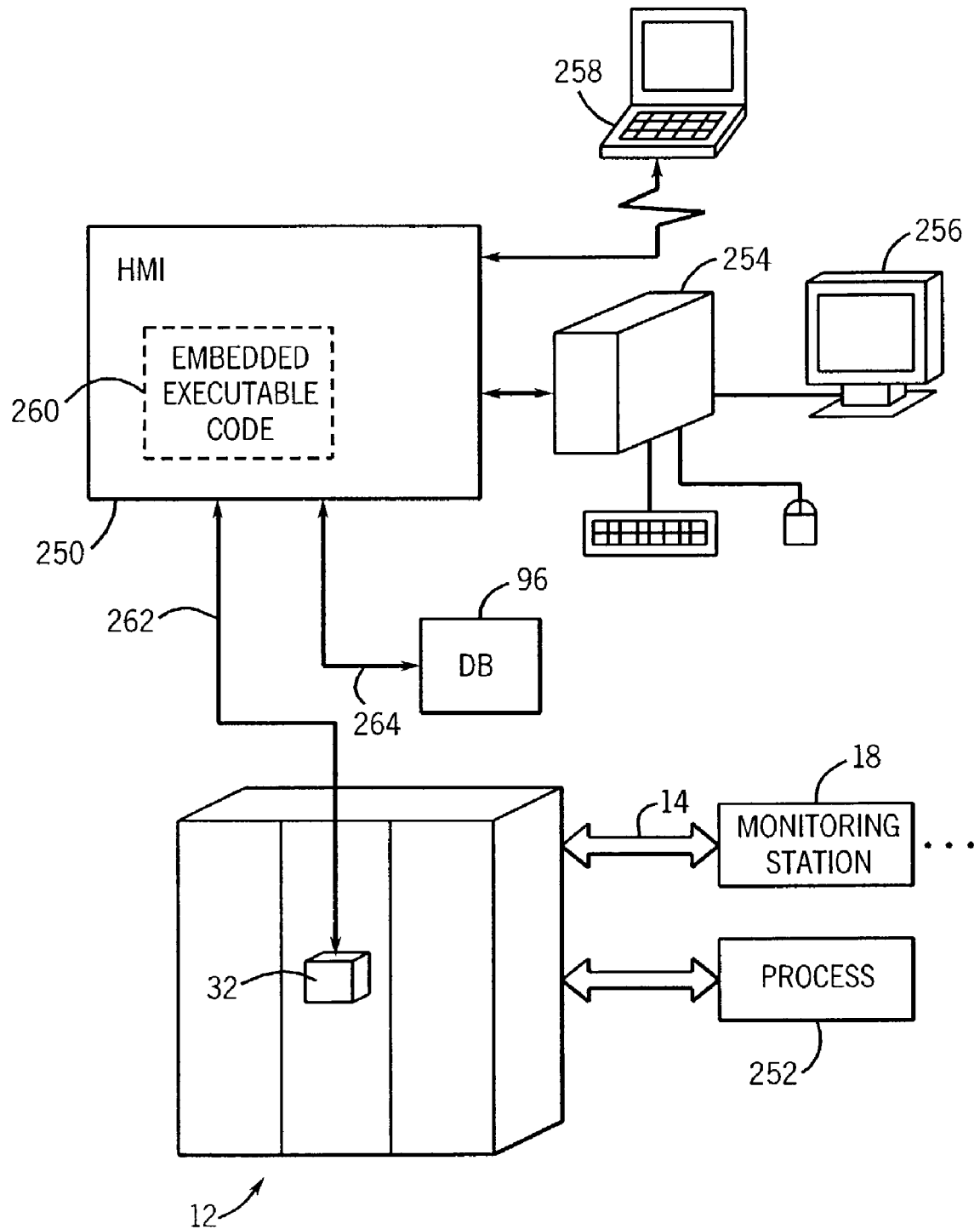
FIG. 15 is a diagrammatical representation of an electrical control and monitoring system including networked programmable components and monitoring stations, remote resources, human machine interface, and additional network components in accordance with aspects of the present technique.

Turning to the integration of the monitoring and control systems with the human machine interface, FIG. 15 is a diagrammatical representation of an electrical control and monitoring system including networked programmable components, a monitoring station, a remote resource, a human machine interface, and additional network components in accordance with aspects of the present technique. In this representation, a human interface machine (HMI) 250 interacts with a process 252. The HMI 250 may provide the information or data to an operator through a computer workstation 254.

Process 252 may include any process capable of being remotely controlled and/or monitored. In industrial settings, for example, the process may include manufacturing, material handling, machining, assembly and other operations for producing products. In other settings, however, equipment and operations included in the process may include regulation of flows, pressures, levels, reactions, and so forth. In still other applications, the processes may include propulsion or power generation or distribution. In short, the present technique may applied to any process that can be represented via a human machine interface and monitored or controlled via a monitoring and control system.

The computer workstation 254 may display the process 252 information to a human operator, enabling the operator to the monitor or control components within the process 252. The computer workstation 254, which may be a portable device or desktop unit, is in communication with the HMI 250. As discussed above with regard to the computer console 64, the computer workstation 254 may include a processor and various types of memory, such as magnetic or optical memory devices (e.g., CD ROM's). Further, the computer workstation 254 may be adapted to cooperate with peripheral devices, such as conventional computer monitor 256 that may display a graphical representation of the process 252, and related information from the HMI 250 to the user or operator. Additionally, the computer workstation 254 may be coupled to input devices such as a keyboard, a printer, and mouse.

To provide access to remote locations, the HMI 250 may provide an interface to a remote computer 258 via a network. For instance, in the illustrated embodiment, a remote device or laptop 258 may be coupled to HMI 250 to display representations of the systems, monitor parameters sensed or controlled by the system, program components of the system, and so forth. This interaction may permit remote monitoring and control of components in the system via a network. The network may include a wide area network, a local area network, the Internet, virtual private networks, dedicated communications links, and so forth.

The HMI 250 includes an embedded executable code 260 that communicates with a component 32, typically a programmable physical component via a link 262, as well as with the database 96 discussed above, via a link 264. The embedded executable code 260 may access the component 32 or the database 96 to change parameters, observe data, record trend data, or other parameter data. The embedded executable code 260 may be or include a software component embedded in the HMI 250, or an embedded executable program, such as an applet or ActiveX control. The latter type of program architecture is generally available from Microsoft Corporation of Redmond, Wash.

As an example of the functionality provided by the embedded executable code 260, this program may provide any desired detailed information to supplement the data provided by the human machine interface, including the types of views discussed above. Thus, the embedded executable code or program may generate and display, in the MCC context for example, an MCC unit monitor view, an MCC elevation view, an MCC spreadsheet view, an MCC documentation view of drawings, user manuals, spare parts lists, or event logs. The functionality allows the operator to utilize the HIM 250 in a more efficient manner by accessing a variety of different sets of data and corresponding control or monitoring views. As discussed below in greater detail, the embedded executable code 260 may utilize any suitable technique to activate execution and to provide the desired information, such as pressing a specific virtual button, typing a specific word, or clicking on an item within the display or representation, and so forth.

As discussed above, the component 32 may be located within the assembly 12. In general, the component 32 may serve to regulate any useful industrial process or load, and may be configured to function in cooperation with other components, such as to protect the other components from overcurrent conditions, loss of phase, ground fault, or any other abnormal or unwanted condition. In normal operation, the component 32 functions in accordance with a predetermined routine or program, either stored within the device itself, in memory of a programmable logic controller, or in memory of another device. Moreover, operation of the component may be regulated in accordance with parameters sensed by the component itself, or by system sensors. Finally, operation of such devices may be regulated by operator-induced command inputs, including inputs made via a computer interface, push buttons, switches, or in any other suitable manner.

Likewise, as discussed above, the component assembly 12 may take many forms and include devices for accomplishing many different and varied purposes. The component assembly 12 may enable the exchange of information which allows the process 252 to be monitored by a monitoring station 18 connected via a network 14. As discussed above, the monitoring station 18 may communicate operational status and parameters to be monitored in real time, and affords programming of certain of the components of assembly 12. It should be noted that while a single assembly 12 is illustrated in the figures and described herein, the component assembly 12 may, in fact, include a range of assemblies, each located near one another or remote from one another in a particular application, interconnected with monitoring station 18 via network 14. Similarly, the network 14 may provide access to other devices or components, and the monitoring station 18 may be one of a plurality of monitoring stations coupled to various other assemblies.

In addition to communicating with the component 32, the embedded executable code 260 may interact with the database 96, which will typically include data for regulating or monitoring many of the operating functions, including communication with the system components, programming or reprogramming of the system components, generation of user viewable representations of the system, and so forth. As discussed above, in a present embodiment, the database 96 includes entries designating the system, the components in the system, physical and network addresses and configuration parameters of the components, textual labels for user viewable representations, system settings, events, designated data, etc.

In operation, the operator utilizes the HMI 250 to monitor and control the process 252. A mechanism may be utilized to activate the embedded executable code 260, which produces the requested information from the database 96 or the component 32 via a viewable image on the monitor 256, such as a monitoring or control window. By activating the embedded executable code 260, the operator may interact with the selected programmable physical component through the HMI 250 to change parameters, observe data, record trend data, or manipulate other parameter data for the process.

Figure 16:
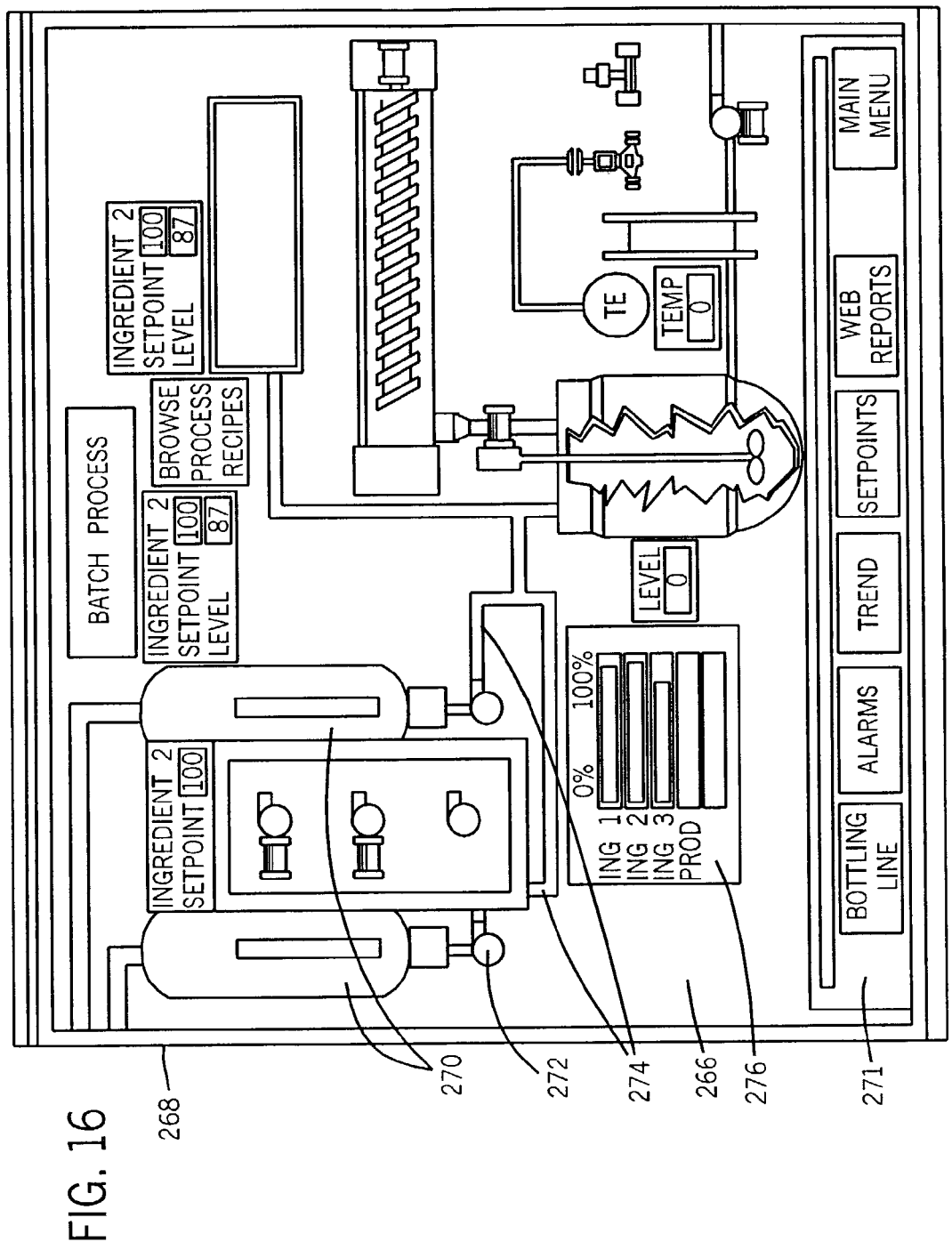
FIG. 16 is a graphical representation of a system or process including a range of components as might be generated on a human machine interface in accordance with aspects of the present technique.

As depicted in FIG. 16, a graphical representation of a process, including a plurality of physical components represented as symbols is shown as might be generated by a human machine interface. In this view, a user representation of a page or displayed image is presented, which may be viewable on the monitor 256 (see FIG. 15) or another device configured to display images for the HMI 250. In this embodiment, the screen includes a displayed image 266 which is within a frame 268 that surrounds the information displayed for the user. Within the frame 268 or on the outer portion of the frame 268, a command bar or menu 271 may be provided for selecting different commands to access various items on the page. The menu 271 may include the name of the component being accessed, the view being displayed, or other information.

Within the displayed image 266, graphical objects may be displayed to provide the user with information, to guide the user in understanding the process, or to assist the user in utilizing the monitoring or control system. The displayed image 266 may also include graphical component representations 270 of different components or devices within the process. These component representations 270 may correspond to components, such as the component 32, the assembly 12, programmable devices, or other items within the process 252, as depicted in FIG. 15 and in the figures described in the previous section of the present description. Furthermore, the displayed image 266 may include specific objects corresponding to physical objects or components, as represented at reference numeral 272, such as virtual buttons which may be selected or actuated by an operator via an input device such as a conventional mouse or keyboard. The virtual object 272 may be utilized to activate the embedded executable code 260 (see FIG. 15). For instance, the virtual object 272 may activate the embedded executable code by pressing a specific virtual button associated with the object, typing a specific word, or clicking on an item within the display, such as the object itself.

To clarify the viewable items within the displayed image 266, a graphical link 274 may be used to illustrate the interconnections or flow path for the component representations 270 and the virtual objects 272. The graphical links 274 may enable the viewer to understand the general flow of the associated process or interaction of the components being viewed. Also, charts or graphs 276 may be displayed to the operator to provide additional information in a visual and textual manner. Generally, the items within the displayed image 266 may be designed in relation to the relative sizes, the criticality in operation, or the locations of the component representations. Any suitable software may be used for the HMI programmed to generate the graphical representation and associated views, such as software commercially available from Rockwell Software Incorporated of Milwaukee, Wis., under the designation RSView 32 or RSView SE.

Figure 17:
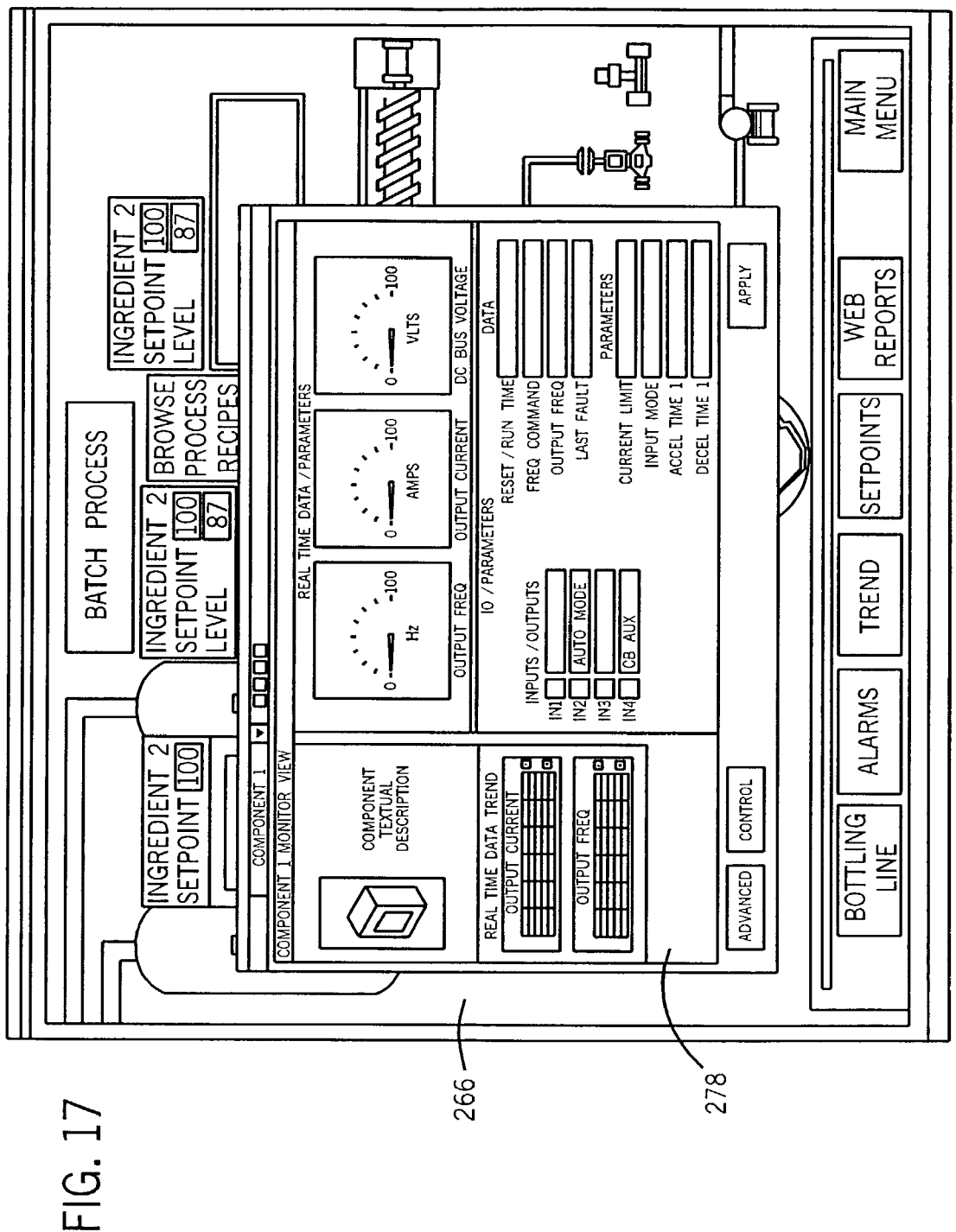
FIG. 17 is a graphical representation of a system as shown in FIG. 16, with an overlay of a control or monitoring view or window as generated by an embedded executable program within the human machine interface.

To operate the enhanced functionality through the HMI 250, the virtual object 272 may be used to activate the embedded executable code 260 discussed above. Once the embedded executable code 260 is activated, the displayed image 266 may generate another viewable image 278, such as a monitoring or control window, which is depicted in FIG. 17. In this view, an exemplary embodiment of a layout view of the type shown in FIGS. 8–13 in accordance with aspects of the present technique is shown. In this embodiment, a user viewable representation of a page or screen is displayed, which may be viewable on the monitor 256 or another device configured to display images for the HMI 250. The viewable image 278 may be located within or overlying the displayed image 266, adjacent to the displayed image 266, or on another page. By activating the virtual object 272, the embedded executable code may be activated to provide any of the views previously discussed (e.g. FIGS. 8–13), or an other view or presentation detailing data for the selected object.

For instance, an MCC unit monitor view, an MCC elevation view, an MCC spreadsheet view, or an MCC documentation view of documents, drawings, user manuals, spare parts lists, real time operational data, or event logs may be displayed to the user through the viewable image 278. Advantageously, this allows the user to operate the HMI, while enabling easy access to operational parameters, event logs, predictive failure information, component history, real time data, and related documentation.

It should be noted that while reference is made herein to accessing and displaying data relating to a selected physical component, the information displayed to the operator may relate more generally to any component linked to the object activated. That is, an operator may activate an area on the human machine interface process representation corresponding to a pump, for example. However, the associated embedded executable program may be configured to access and display information relating to any control or monitoring component, such as a motor drive for an electric motor coupled to the pump, to follow the example. Thus, it should be borne in mind that selection of the desired physical component may be made by activation of any desired object or objects available to the human machine interface, although these may conveniently be elements of the process or system represented in the display.

FIG. 18 summarizes steps illustrating exemplary logic in the programming and operating phases of the system illustrated in the foregoing figures. As illustrated in FIG. 18, the monitoring process, designated generally by the reference numeral 280, includes several phases, including a monitoring and control system configuration phase 214, an HMI configuration phase 282, and a run phase 284. As described above, the first phase 214 includes a series of steps or acts as described above with reference to FIG. 14. In an exemplary embodiment, the second phase 282 begins with opening a blank screen in the HMI as noted in step 286. As discussed above, the HMI may be accessed via any suitable device or means that enables the user or operator to control a program running on the HMI. Once the blank page is opened, the user may insert a specific monitoring and control software component desired, such as via a drop-down menu in a programming mode. In this step 288, the user may define the virtual object 272 by designating the color, shape, text or other features associated with the item. Again, such items may consist of elements of the graphical representation itself, or may be graphical items added to the representation, textual items, or any other suitable indicia. Also, in step 288, the user may access various views, such as the MCC unit monitor view, the MCC elevation view, the MCC spreadsheet view, or the MCC documentation view desired for presentation of the desired information by later activation of the associated object. At step 290, the component properties are configured for the hardware component. In configuring these properties, a database, such as the database 96 of FIG. 15, may be consulted in step 292 to verify parameter data or to define default values. The programming of the desired view may follow the general procedures outlined in the previous section of this description, such as for setting the items, values, and so forth of the desired view.

The third phase 284, the run phase, corresponds to normal operation of the system or process and of the HMI. During such operation, an operator may select a desired hardware component via the HMI, as indicated at step 294. Again, the actual physical component selected may be any component that was associated with the activated object during the configuration of the HMI. This step 294 then results in activating the embedded executable code, such as by pressing a specific button, typing a specific word, or clicking on an item or object within the page as discussed above. At this step 296, the embedded executable code is activated, which executes the monitoring and control software component. By executing the software component, the HMI, via the embedded executable program, accesses the database in step 298 to consult with the database for the information or to retrieve the hardware component information. It should be noted that such consultation of the database is preferred in a present embodiment, but may be dispensed with where data is otherwise directly available or where information available from the database (e.g. network address of the selected physical component) is otherwise available to or stored by the HMI or other program. At step 300, the HMI may access the hardware component to retrieve the information or data within the hardware component, or instructions on accessing the desired data. Finally, at step 302, the information is displayed via the programmed monitoring and control view, as described above.

Advantageously, in addition to the easy access of information discussed above, the functionality provided from these steps enables the present technique to reduce the HMI development time and associated costs, which are generally required to provide this level of information to a HMI. As the operator may access a single interface to gain access to the information, the inefficiency associated with operating two separate programs is eliminated. Along with increased efficiency, the operator may be more proactive in troubleshooting the system and is supplied with more detailed and current data relating to normal production or operation, and to abnormal occurrences While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for monitoring or controlling operation of an electrical industrial equipment system, the method comprising:

displaying a representation of programmable physical components of the system in a computer workstation for a human operator based upon display data received from a program embedded in a separate human machine interface;

detecting an operator selection of one of the physical components from the representation on the computer workstation;

executing a software component of the program embedded in the human machine interface to acquire data representative of real time operation of the selected physical component based on the operator selection; and displaying a monitoring or control window in the computer workstation based upon the acquired data.

2. The method of claim 1, wherein at least some of the data acquired by the software component is stored in a database accessed by the software component upon execution thereof.

3. The method of claim 2, wherein the database stores data representative of a network address for the selected component, and wherein the data acquired by the software component include data acquired from the selected physical component at the network address.

4. The method of claim 2, wherein the database stores designation data for the selected physical component that include data representative of a function of the selected physical component in the equipment system.

5. The method of claim 1, wherein each of the physical components includes a memory object storing configuration parameters thereof, and wherein the data acquired by the software component include data acquired from the memory object of the selected physical component.

6. The method of claim 1, comprising the further step of configuring each of the physical components and a database for the physical components from which data are acquired upon selection of the software component.

7. The method of claim 1, comprising the further step of configuring the software component by specific reference to a linked physical component represented via the human machine interface.

8. The method of claim 1, wherein the system includes a motor control center and the physical components include electrical power devices configured to drive electric motors.

9. The method of claim 1, wherein the monitoring or control window includes representations of virtual meters indicating operational parameters of the selected physical component.

10. The method of claim 1, wherein the monitoring or control window includes a link to documentation descriptive of the selected physical component.

11. The method of claim 1, wherein the monitoring or control window includes a spreadsheet presenting data representative of operational events for the selected physical component.

12. The method of claim 1, wherein the monitoring or control window includes a physical representation of the selected physical component in the equipment system.

13. A computer system for monitoring or controlling operation of an electrical industrial equipment system, the system comprising:

an human machine interface having an embedded human machine interface program configured to display a representation of programmable physical components of the system on a computer workstation for a human operator and to detect an operator selection of one of the physical components from the representation on the computer workstation; and an executable software component embedded in the human machine interface program and configured to acquire data representative of real time operation of the selected physical component, and to display a monitoring or control window in the computer workstation based upon the acquired data.

14. The system of claim 13, further comprising a database for storing data representative of operational parameters of the selected physical component, wherein at least some of the data acquired by the software component is stored in a database accessed by the software component upon execution thereof.

15. The system of claim 14, wherein the database stores data representative of a network address for the selected component, and wherein the data acquired by the software component include data acquired from the selected physical component at the network address.

16. The system of claim 13, wherein the software component is configured to specifically reference a linked physical component represented via the human machine interface program.

17. An electrical industrial equipment system comprising:

a plurality of programmed physical components configured to control operation of electrical loads; and a computer system coupled to the physical components for monitoring or controlling operation of the physical components, the computer system comprising:

an human machine interface having an embedded human machine interface program configured to display a representation of the programmable physical components of the system on a computer workstation for a human operator, and to detect an operator selection of one of the physical components from the representation on the computer workstation; and an executable software component embedded in the human machine interface program and configured to acquire data representative of real time operation of the selected physical component, and to display a monitoring or control window in the computer workstation based upon the acquired data.

18. The system of claim 17, further comprising a database for storing data representative of operational parameters of the selected physical component, wherein at least some of the data acquired by the software component is stored in a the database by the software component upon execution thereof.

19. The system of claim 18, wherein the database stores data representative of a network address for the selected component, and wherein the data acquired by the software component include data acquired from the selected physical component at the network address.

20. The system of claim 17, wherein the software component is configured to specifically reference a linked physical component represented via the human machine interface program.

21. The system of claim 17, wherein each of the physical components includes a memory object storing configuration parameters thereof, and wherein the data acquired by the software component include data acquired from the memory object of the selected physical component.

22. The system of claim 17, wherein the physical components comprise a motor control center and the physical components include electrical power devices configured to drive electric motors.

23. A system for monitoring or controlling operation of an electrical industrial equipment system, the system comprising:

means for displaying a representation of programmable physical components of the system in a computer workstation for a human operator based on display data received from a program embedded in a separate human machine interface;

means for detecting an operator selection of one of the physical components from the representation in the computer workstation and executing a software component of the program embedded in the human machine interface to acquire data representative of real time operation of the selected physical component; and means for displaying a monitoring or control window in the computer workstation based upon the acquired data.

24. The system of claim 23, wherein the means for displaying includes a graphics program for displaying a physical representation of programmable physical components of the system.

25. The system of claim 24, wherein the means for acquiring data includes an executable software component embedded in the human machine interface program.

26. The system of claim 23, further comprising a database for storing at least some of the data acquired by the means for acquiring data.

27. The system of claim 26, wherein the database stores designation data for the selected physical component that include data representative of a function of the selected physical component in the equipment system.

28. The system of claim 23, wherein each of the physical components includes a memory object storing configuration parameters thereof, and wherein the data acquired by the means for acquiring data include data acquired from the memory object of the selected physical component.

29. The system of claim 23, wherein the monitoring or control window includes representations of virtual meters indicating operational parameters of the selected physical component.

30. The system of claim 23, wherein the monitoring or control window includes a link to documentation descriptive of the selected physical component.

31. The system of claim 23, wherein the monitoring or control window includes a spreadsheet presenting data representative of operational events for the selected physical component.

32. A computer program for monitoring or controlling operation of an electrical industrial equipment system comprising:

at least one machine readable medium; and a computer program stored on the at least one medium and including routines for displaying a representation of programmable physical components of the system in a computer workstation for a human operator based upon display data received from a program embedded in a separate human machine interface; detecting an operator selection of one of the physical components from the representation on the computer workstation; executing a software component of the program embedded in the human machine interface to acquire data representative of real time operation of the selected physical component based on the operator selection; and displaying a monitoring or control window in the computer workstation based upon the acquired data.

33. The computer program of claim 32, wherein at least some of the data acquired by the software component is stored in a database accessed by the software component upon execution thereof.

34. The computer program of claim 33, wherein the database stores data representative of a network address for the selected component, and wherein the data acquired by the software component include data acquired from the selected physical component at the network address.

35. The computer program of claim 33, wherein the database stores designation data for the selected physical component that include data representative of a function of the selected physical component in the equipment system.

36. The computer program of claim 32, wherein the monitoring or control window includes representations of virtual meters indicating operational parameters of the selected physical component.

37. The computer program of claim 32, wherein the monitoring or control window includes a link to documentation descriptive of the selected physical component.

38. The computer program of claim 32, wherein the monitoring or control window includes a spreadsheet presenting data representative of operational events for the selected physical component.

39. A system for monitoring operation of a component comprising:

a computer workstation configured to display a representation of a system having associated components;

a reference database configured to store data pertaining to the associated components; and a program executable by selection of a component by reference to the representation displayed on the computer workstation, the program embedded in a human machine interface separate from the computer workstation and configured to access operational data from the selected component based upon data from the reference database and to display user viewable indicia on the computer workstation via the human machine interface based upon the accessed operational data.

40. The system of claim 39, wherein the system includes an industrial process monitored by the interface.

41. The system of claim 39, wherein the data stored in the reference database includes a network address for at least the selected component.

42. The system of claim 39, wherein the program includes executable code embedded in the human machine interface.

43. The system of claim 39, wherein the program includes an association between a user viewable indicium of the representation and a physical component selectable by user activation of a region associated with the indicium.

44. The system of claim 43, wherein the association between the user viewable indicium of the representation and the physical component is user configurable.

* * * * *